(12) United States Patent
Goto et al.

(10) Patent No.: US 7,383,143 B2
(45) Date of Patent: Jun. 3, 2008

(54) CORRECTION METHOD, COMPUTER-READABLE RECORDING MEDIUM STORING COMPUTER-EXECUTABLE CORRECTION PROGRAMS AND MEASUREMENT APPARATUS

(75) Inventors: Tomonori Goto, Sapporo (JP); Soichi Kadowaki, Kawasaki (JP); Naoji Horiuchi, Kawasaki (JP); Jyota Miyakura, Kawasaki (JP)

(73) Assignee: Mitutoyo Corporation, Kawasaki (JP)

( * ) Notice: Subject to any disclaimer, the term of this patent is extended or adjusted under 35 U.S.C. 154(b) by 0 days.

(21) Appl. No.: 11/699,450

(22) Filed: Jan. 30, 2007

(65) Prior Publication Data
US 2007/0192052 A1    Aug. 16, 2007

(30) Foreign Application Priority Data

| Feb. 16, 2006 | (JP) | ............................. | 2006-039690 |
| Apr. 24, 2006 | (JP) | ............................. | 2006-118767 |
| Aug. 11, 2006 | (JP) | ............................. | 2006-220083 |

(51) Int. Cl.
*G01P 21/00* (2006.01)
(52) U.S. Cl. ..................................... 702/94
(58) Field of Classification Search ................. 702/94, 702/95, 150–155, 167
See application file for complete search history.

(56) References Cited

U.S. PATENT DOCUMENTS

| 4,945,501 A | * | 7/1990 | Bell et al. ...................... 702/95 |
| 5,150,314 A |   | 9/1992 | Garratt et al. |
| 6,453,730 B2 | * | 9/2002 | Takemura ...................... 73/105 |
| 6,763,319 B2 | * | 7/2004 | Handa et al. ................ 702/168 |
| 2001/0029778 A1 | * | 10/2001 | Takemura ...................... 73/104 |
| 2007/0260411 A1 | * | 11/2007 | Goto et al. .................... 702/95 |

FOREIGN PATENT DOCUMENTS

| DE | 101 15 288 | * 10/2001 |
| EP | 0 404 597 A1 | 12/1990 |
| JP | A 3-115902 | 5/1991 |
| JP | A 8-338718 | 12/1996 |
| JP | A 9-329402 | 12/1997 |
| JP | A 2003-500675 | 1/2003 |
| WO | WO 2007/020441 A1 | 2/2007 |

OTHER PUBLICATIONS

Lee, C.O., et al. "An Algorithm for Stylus Instruments to Measure Aspheric Surfaces," *Meas. Sci. Technol.,* vol. 16, pp. 1215-1222 (2005).

* cited by examiner

*Primary Examiner*—Michael P Nghiem
(74) *Attorney, Agent, or Firm*—Oliff & Berridge, PLC

(57) ABSTRACT

A correction method for correcting measurement error in data obtained when a stylus tip of a measurement apparatus that moves following the height of a workpiece traces the workpiece along a measurement axis, the measurement error having occurred due to stylus movement in a plane defined by the measurement axis and height directions, the method includes a calibration measurement process of obtaining calibration measurement data that includes shift information on the position of the stylus tip, corresponding to the position of the stylus tip in the height directions while the stylus is moved in the correction target plane and a correction-parameter setting process obtaining a correction parameter value optimal to correct the shift information on the position of the stylus tip, included in the calibration measurement data, for each of the sectors obtained by dividing a measurement range in the height directions.

20 Claims, 10 Drawing Sheets

CORRECTION METHOD, COMPUTER-READABLE RECORDING MEDIUM STORING COMPUTER-EXECUTABLE CORRECTION PROGRAMS AND MEASUREMENT APPARATUS

RELATED APPLICATIONS

This application claims priority to the Japanese Patent Application No. 2006-39690 dated on Feb. 16, 2006 and Japanese Patent Application No. 2006-118767 dated on Apr. 24, 2006 and Japanese Patent Application No. 2006-220083 dated on Aug. 11, 2006 are hereby incorporated with reference for all purposes.

BACKGROUND OF THE INVENTION

1. Field of the Invention

The present invention relates to a correction method, computer-readable recording mediums storing computer-executable correction programs and measurement apparatuses, and in particular, relates to an improved method for deriving correction parameters used to correct measurement errors due to the movement of a stylus.

2. Prior Art

Precision measurement apparatuses, such as form measuring instruments, have been used to measure the contours of workpieces. Such a precision measurement apparatus includes a stylus and a pickup unit for the stylus; the stylus moves along a circular arc, depending on the height of a workpiece, when the position of a tracing made by a tip of the stylus is moved on the workpiece along a measurement axis. While the stylus tip traces the surface of the workpiece, the pickup unit obtains coordinate information of the workpiece. According to the obtained coordinate information of the workpiece, the contour of the workpiece is determined.

Some precision measurement apparatuses include a linearly-moving stylus that moves straight depending on the height of a workpiece when a trace position is moved along a measurement axis, and a pickup unit for the stylus.

Precision measurement apparatuses are required to perform more precise measurement than general measurement apparatuses. In a precision measurement apparatus provided with a pickup unit for a pivot-type stylus, however, since the stylus arm moves along a circular arc, the measurement results contain errors. It is very important to reduce these errors appropriately.

Conventionally, data measured by the pivot-type stylus is corrected by a correction method such as that described in the specification, and elsewhere, of Japanese Patent No. 2,727,067, Japanese Patent No. 3,215,325, Japanese Unexamined Patent Application Publication No. 2003-500675, Japanese Unexamined Patent Application Publication No. Hei-03-115,902, or U.S. Pat. No. 5,150,314, to reduce the effects of the measurement errors caused by the circular-arc movement of the pivot-type stylus.

It is also very important for a precision measurement apparatus provided with a pickup unit for a linearly-moving stylus to reduce the effects of the measurement errors caused by the straightness deviations of the straight movement of the stylus.

It has been desired that the correction precision obtained by the conventional method of data measured by a stylus be further improved, but there has thus far been no appropriate technology to achieve this.

SUMMARY OF THE INVENTION

The present invention has been made in view of the foregoing issues. Accordingly, it is an object of the present invention to provide a correction method, a computer-readable recording medium storing a computer-executable correction program and a measurement apparatus capable of precisely correcting data measured by a stylus.

The inventors of the present invention researched methods to reduce measurement errors caused by circular-arc movements of a pivot-type stylus, and they found that even a deviation of an actual circular-arc movement of the pivot-type stylus from an ideal circular-arc movement can be modeled more appropriately when data measured with the pivot-type stylus is corrected by a multilayer style algorithm than when one correction parameter value is specified for the whole of a measurement range in height directions in a conventional method. The inventors thereby found that more precise correction is possible and completed the present invention.

In addition, the inventors of the present invention researched methods to reduce measurement height errors caused by the straightness deviations of a straight movement of a linearly moving stylus. They found, in the same way as for the pivot-type stylus, that more precise correction can be performed when data measured with the linearly moving stylus is corrected by a multilayer style algorithm rather than by a conventional method, and they completed the present invention.

<Correction Method>

In order to achieve the object described above, a correction method according to the present invention, corrects a measurement error in data obtained when a tip of a stylus of a measurement apparatus that moves following the height of a workpiece traces the workpiece along a measurement axis. The measurement error has occurred due to stylus movement in a correction target plane defined by the measurement axis and height directions. And the measurement error targets a shift of the position of the stylus tip, corresponding to the position of the stylus tip in the height directions in the correction target plane. The correction method comprises the step of a calibration measurement process and a correction-parameter setting process.

Here, the calibration measurement process obtains calibration measurement data that includes shift information on the position of the stylus tip, corresponding to the position of the stylus tip in the height directions while the stylus is moved in the correction target plane.

Also, the correction-parameter setting process simultaneously obtains a correction parameter value optimal to correct the shift information on the position of the stylus tip, included in the calibration measurement data obtained in the calibration measurement process, for each of a predetermined number of sectors obtained in advance by dividing a measurement range in the height directions.

<Correction Program>

In order to achieve the object described above, a computer-readable recording medium storing a computer-executable correction program according to the present invention, corrects a measurement error in data obtained when a tip of a stylus of a measurement apparatus that moves following the height of a workpiece traces the workpiece along a measurement axis. The measurement error has occurred due to stylus movement in a correction target plane defined by the measurement axis and height directions. And the measurement error targets a shift of the position of the stylus tip, corresponding to the position of the stylus tip in the height directions in the correction target plane. The correction program causes a computer to execute the calibration measurement process and the correction-parameter setting process.

Preferably, in the present invention, the stylus tip traces a reference workpiece having a reference shape along the measurement axis in order that the stylus is moved in the correction target plane, in the calibration measurement process. The stylus tip traces the reference workpiece to obtain cross-sectional-shape information in the correction target plane in order to obtain the shift information on the position of the stylus tip, corresponding to the position of the stylus tip in the height directions, in the calibration measurement process. The calibration measurement data in the correction target plane is compared with reference information on the reference workpiece in order to obtain the correction parameter value, in the correction-parameter setting process.

Preferably, in the present invention, in the correction-parameter setting process, an actual operation trajectory actually drawn by the stylus in the correction target plane is estimated according to the calibration measurement data. An ideal operation trajectory of the stylus in the correction target plane is estimated according to the reference shape of the reference workpiece. In the correction-parameter setting process, the actual operation trajectory is compared with the ideal operation trajectory to estimate the shift information on the position of the stylus tip, corresponding to the position of the stylus tip in the height directions, a correction parameter value optimal to correct the estimated shift information is obtained.

Preferably, in the present invention, the stylus is a pivot-type stylus performing a circular-arc movement in the correction target plane, and the correction unit corrects a measurement error caused by the circular-arc movement of the pivot-type stylus in the correction target plane.

Preferably, in the present invention, the stylus is a linearly moving stylus performing straight movement in the correction target plane, and the correction unit corrects a measurement error caused by the straightness deviations of the straight movement of the linearly moving stylus in the correction target plane.

Preferably, in the present invention, a measurement-range dividing process provided prior to the correction-parameter setting process, of dividing the measurement range in the height directions into the predetermined number of sectors, is provided.

Preferably, in the present invention, a reference sphere which approximates an ideal sphere and having a surface that has been precisely finished is traced as the workpiece to obtain the calibration measurement data in the calibration measurement process.

Preferably, in the present invention, the calibration measurement data obtained in the calibration measurement process is compared with reference information of a reference workpiece to obtain all the correction parameter values simultaneously in the correction-parameter setting process.

Preferably, in the present invention, a division count (division number) N in the measurement range in the height directions is set to a value equal to or greater than 10 and equal to or less than 50.

If the division count N for the measurement range in the height directions is less than 10, sufficient correction results may not be obtained. Conversely, if the division count N is greater than 50, stability of the calculation results may be impaired.

Preferably, in the present invention, positions at which the measurement range in the height directions is divided are determined according to a position at which the pivot-type stylus is parallel to the measurement axis.

Preferably, in the present invention, a data correction process provided subsequent to the correction-parameter setting process, of correcting measured data obtained when the stylus tip traces a measurement-target workpiece, with the use of the correction parameter values is provided.

In the data correction process, among the correction parameter values set in the correction-parameter setting process, a correction parameter value which is optimum for a sector in which the measured data belongs, the sector being identified by the height value of the measured data, is selected, the selected correction parameter value is used as a correction parameter value which is optimal to correct the measured data.

<Further Stabilization of Multilayer Style Algorithm>

Preferably, in the present invention, the correction parameter value is estimated by a robust estimation method such that the degree of influence of outlier included in the calibration measurement data, on the calculation of the correction parameter value is minimized, in the correction-parameter setting process.

Preferably, in the present invention, in order not to generate a difference greater than a predetermined value between correction parameter values in adjacent sectors of the sectors when the correction parameter values are obtained, a constrained condition is applied to the correction parameter values in the adjacent sectors to associate the correction parameter values in the adjacent sectors with each other.

Preferably, in the present invention, a pre-process is provided.

Here, the pre-process provided prior to the correction-parameter setting process, of optimizing a design value given from the outside, is provided.

Also, the correction parameter value is obtained with an initial value being set to the design value optimized in the pre-process, in the correction-parameter setting process.

<Measurement Apparatus>

In order to achieve the object described above, a measurement apparatus according to the present invention, in which a correction program according to this invention is executed, comprises a stylus, a pickup unit and a correction unit.

Here, the stylus is displaced following the height of a workpiece.

Also, the pickup unit detects the position of the stylus at least in height directions.

The correction unit corrects a measurement error in data obtained when a stylus tip traces the workpiece along a measurement axis.

The correction unit comprises a calibration measurement section, a correction-parameter setting section and a data correction section.

Here, the calibration measurement section obtains calibration measurement data that includes shift information on the position of the stylus tip, corresponding to the position of the stylus tip in the height directions while the stylus is moved in a correction target plane defined by the measurement axis and the height directions.

Also, the correction-parameter setting section simultaneously obtains a correction parameter value which is optimal to correct the shift information on the position of the stylus tip, included in the calibration measurement data obtained by the calibration measurement section, for each of a predetermined number of sectors obtained in advance by dividing a measurement range in the height directions.

The data correction section selects a correction parameter value optimal to a sector to which measured data obtained when the stylus tip traces a measurement-target workpiece belongs, the sector is identified by the height value of the measured data, among the correction parameter values obtained by the correction-parameter setting section. And the data correction section uses the selected correction parameter value to correct the measured data.

The measurement error is generated due to the stylus movement in the correction target plane, and the measurement error targets a shift of the position of the stylus tip, corresponding to the position of the stylus tip in the height directions in the correction target plane.

Preferably, in the present invention, the stylus is a pivot-type stylus performing a circular-arc movement in the correction target plane. And the correction unit corrects a measurement error caused by the circular-arc movement of the pivot-type stylus in the correction target plane.

Preferably, in the present invention, the stylus is a linearly moving stylus performing straight movement in the correction target plane. And the correction unit corrects a measurement error caused by the straightness deviations of the straight movement of the linearly moving stylus.

The height-direction measurement range divided in advance into a predetermined number of sectors is either the height-direction measurement range identified by the results of calibration measurement data obtained when the stylus tip traces the reference workpiece, divided into a plurality of sectors, or the height-direction measurement range determined by the performance of the apparatus, divided into a plurality of sectors.

Comparing the calibration measurement data with the reference shape information of the reference workpiece to obtain a correction parameter value optimal to correct the measurement error caused by the stylus movement means that the correction parameter value is obtained such that corrected data obtained by correcting the calibration measurement data with the correction parameter value most approximates the reference shape information of the reference workpiece.

Obtaining a correction parameter value for each sector simultaneously means that correction-parameter calculation processing is performed at the same time for each sector rather than at different timing, in other words, that a correction parameter for each sector is obtained depending only on data items belonging to that sector and a common parameter is obtained depending on data items belonging to all sectors.

Correction parameters to be obtained are divided into that existing in each sector and that common to all sectors. For example, three parameters, gain "g", the length "l" of the stylus arm, and the height "h" of the stylus edge, serve as correction parameters in each sector (layer). In this case, if there are N sectors (layers), the total number of these correction parameters is 3×N. When the reference workpiece is a reference sphere, three parameters, the coordinates X and Y of the center of the sphere and the radius "r" of the stylus tip (or the radius "R" of the sphere), serve as common correction parameters.

If the correction parameters are calculated separately for each sector, the common correction parameters are also obtained separately. When correction-parameter calculation processing is performed separately for each sector, since data items used represent only a part of the circle, the common correction parameters, the coordinates X and Y of the center of the reference sphere and the radius "r" of the stylus tip (or the radius "R" of the sphere), cannot be obtained correctly. This is because, since data items used represent just a part of the circle, if the data items include noise, it is difficult to determine whether the data items indicate a straight line or a circular arc. In a worse case, the concave and convex of a circular arc are determined conversely.

The measurement target workpiece means a workpiece having an unknown shape and being subjected to shape measurement.

<Further Stabilization of Multilayer Style Algorithm>

Preferably, in the present invention, the correction-parameter setting section estimates the correction parameter value by a robust estimation method such that the degree of influence of outlier included in the calibration measurement data, on the calculation of the correction parameter value, is minimized.

Preferably, in the present invention, in order not to generate a difference greater than a predetermined value between correction parameter values in adjacent sectors of the sectors when the correction parameter values are obtained, a constrained condition is applied to the correction parameter values in the adjacent sectors to associate the correction parameter values in the adjacent sectors with each other.

In the present invention, the measurement apparatuses may further comprises a pre-processor.

The pre-processor is provided prior to the correction-parameter setting section, and optimizes a design value given from the outside.

The correction-parameter setting section obtains the correction parameter value with an initial value being set to the design value optimized by the pre-processor.

<Advantages of the Present Invention>

A correction method and a computer-readable recording medium storing a computer-executable correction program according to the present invention comprises the step of a correction-parameter setting process of simultaneously estimating a correction parameter for each of a plurality of sectors generated by dividing the height-direction measurement range of a stylus of a measurement apparatus. As a result, data measured with the stylus can be corrected more precisely.

A correction method and a computer-readable recording medium storing a computer-executable correction program according to the present invention causes a computer to execute a correction-parameter setting process of simultaneously estimating a correction parameter for each of a plurality of sectors generated by dividing the height-direction measurement range of a stylus of a measurement apparatus. As a result, data measured with the stylus can be corrected more precisely.

In the correction method and the computer-readable recording medium storing the computer-executable correction program according to the present invention, when a correction parameter is simultaneously estimated for each of a plurality of sectors generated by dividing the height-direction measurement range of a pivot-type stylus in the correction-parameter setting process, data measured with the pivot-type stylus can be corrected more precisely.

In the correction method and the computer-readable recording medium storing the computer-executable correction program according to the present invention, when a correction parameter is simultaneously estimated for each of a plurality of sectors generated by dividing the height-direction measurement range of a linearly moving stylus in the correction-parameter setting process, data measured with the linearly moving stylus can be corrected more precisely.

In the correction method and the computer-readable recording medium storing the computer-executable correction program according to the present invention, since calibration measurement is performed by using a reference sphere in a calibration measurement process, precise correction can be applied more efficiently to data measured with the stylus.

In a correction method and a computer-readable recording medium storing a computer-executable correction program according to the present invention, since all correction parameter values necessary for correcting the measurement error caused by the stylus are obtained simultaneously in a correction-parameter setting process, precise correction can be applied more efficiently to data measured with the stylus.

Since the division count of the height-direction measurement range is set to a value from 10 (inclusive) through 50 (inclusive) in a correction program of the present invention, successfully estimated correction parameters are obtained and the correction can be performed further precisely.

Since positions at which the height-direction measurement range is divided are determined according to a position at which the pivot-type stylus is parallel to the measurement axis in a correction program of the present invention, correction parameters can be set further appropriately. Therefore, data measured with the pivot-type stylus can be corrected further precisely.

A measurement apparatus according to the present invention includes a measurement-range divider for diving the height-direction measurement range thereof into a plurality of sectors and a correction-parameter setting unit for simultaneously estimating a correction parameter for each of the plurality of sectors. As a result, data measured with a stylus can be corrected more precisely.

When the stylus is a pivot-type stylus in the measurement apparatus of the present invention, data measured with the pivot-type stylus can be corrected more precisely.

When the stylus is a linearly moving stylus in the measurement apparatus of the present invention, data measured with the linearly moving stylus can be corrected more precisely.

In a correction method, a computer-readable recording medium storing a computer-executable correction program and a measurement apparatus according to the present invention, since a robust estimation method is used to minimize the degree of effect of an outlier on the calculation of a correction parameter value, a multilayer style algorithm of the present invention can be further stabilized. Therefore, the reliability of correction results can be further improved.

In the correction method, the computer-readable recording medium storing the computer-executable correction program and the measurement apparatus according to the present invention, when a constrained condition is applied to correction parameter values in adjacent sectors when the correction parameter values are obtained, the multilayer style algorithm can be further stabilized. Therefore, the reliability of correction results can be further improved.

In the correction method, the computer-readable recording medium storing the computer-executable correction program and the measurement apparatus according to the present invention, when an initial value given from the outside is optimized in a pre-process provided prior to a correction-parameter setting process, the multilayer style algorithm can be further stabilized. Therefore, the reliability of correction results can be further improved.

DESCRIPTION OF THE PREFERRED EMBODIMENT

Preferred embodiments of the present invention will be described below with reference to the drawings.

First Embodiment

Figure 1:
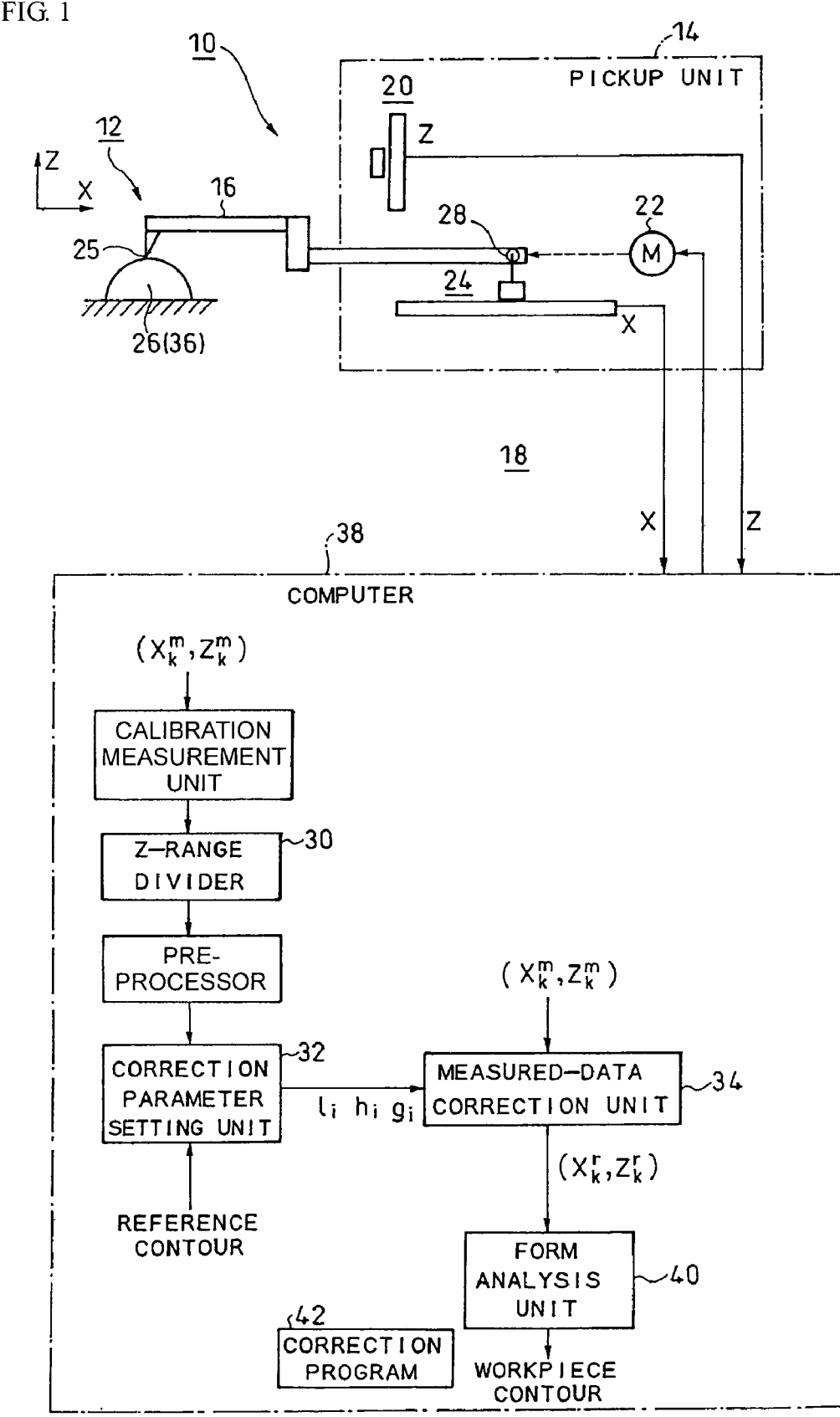
FIG. 1 is a view of a measurement apparatus according to a first embodiment of the present invention.

FIG. 1 shows a schematic structure of a measurement apparatus that employs a circular-arc-movement correction method according to a first embodiment of the present invention. In the first embodiment, the stylus used is assumed to be a pivot-type stylus. A case in which the measurement error caused by the circular-arc movement of the pivot-type stylus is corrected will be described.

In FIG. 1, a form measuring instrument 10 includes the pivot-type stylus (stylus) 12 and a correction section 18. The pivot-type stylus 12 moves along a circular arc in an XZ plane (correction target plane). The correction section 18 corrects the measurement error caused by the circular-arc movement of a stylus arm 16. The correction section 18 includes a pickup unit 14, and the pickup unit 14 operates for the pivot-type stylus 12.

The pickup unit 14 includes a Z-axis detector 20, a feed device 22, and an X-axis detector 24.

While the position at which a stylus tip 25 provided at a tip of the pivot-type stylus 12 traces a reference workpiece 26 (or a measurement-target workpiece 36 having an unknown shape, serving as a target of shape measurement) is moved by the feed device 22 along the X axis (measurement axis), the pivot-type stylus 12 performs circular-arc movement following the height of the workpiece 26 (or 36) with a fulcrum 28 being at the center, and the displacement along the Z axis (height directions) of the stylus 12 is detected by the Z-axis detector 20. In the first embodiment, the Z-axis detector 20 detects the Z position of the stylus arm 16.

The feed device 22 feeds and moves the fulcrum 28 of the pivot-type stylus 12 along the X axis.

The X-axis detector 24 detects the movement distance, along the X axis, of the position at which the stylus tip 25 of the pivot-type stylus 12 traces the workpiece 26 (or 36). To do this in the present embodiment, the X-axis detector 24 detects the movement distance, along the X axis, of the fulcrum 28 of the pivot-type stylus 12.

Based on the length "l" of the stylus arm 16, the height "h" of a stylus edge, circular-arc deformation, the X-axis movement distance output from the X-axis detector 24, and the Z-axis displacement output from the Z-axis detector 20, the form measuring instrument 10 obtains XZ coordinate information of the stylus tip 25. According to the XZ coordinate information of the measurement segment 25, XZ coordinate information of the point on the workpiece 26 (or 36) is obtained. The contour of the workpiece 26 (or 36) is obtained according to XZ coordinate information of points on the workpiece 26 (or 36).

A first feature of the first embodiment is that the correction section 18, which employs a multilayer style algorithm, is provided to precisely correct data measured by the pivot-type stylus 12.

In the first embodiment, in addition to the pickup unit 14 (calibration measurement unit), the correction section 18 includes a Z-range divider (measurement-range divider) 30, a correction-parameter setting unit 32, a measured-data correction unit 34, a form analysis unit 40, and a correction program 42. The pickup unit 14 performs a calibration measurement process of the present invention. The Z-range divider 30 performs a Z-range dividing process (measurement-range dividing process) of the present invention. The correction-parameter setting unit 32 performs a correction-parameter setting process of the present invention. The measured-data correction unit 34 performs a measured-data correction process of the present invention.

In the calibration measurement process, the pickup unit 14 measures the reference workpiece 26 as a calibration measurement unit. In a measurement process in which the measurement-target workpiece 36 is measured, the pickup unit 14 measures the measurement-target workpiece 36, instead of the reference workpiece 26, as a measuring unit.

The form analysis unit 40 analyzes the shape of the measurement-target workpiece 36 according to data corrected by the measured-data correction unit 34.

The correction program 42 causes a computer 38 to execute each process.

The form measuring instrument 10 according to the first embodiment is constructed in outline as described above. The operation thereof will be described below.

A feature of the present invention is that the Z-axis measurement range of the pivot-type stylus 12 is divided into a plurality of sectors, and an optimum correction parameter value is used for each sector in order to precisely correct the measurement error caused by the circular-arc movement of the pivot-type stylus 12.

Figure 2A:
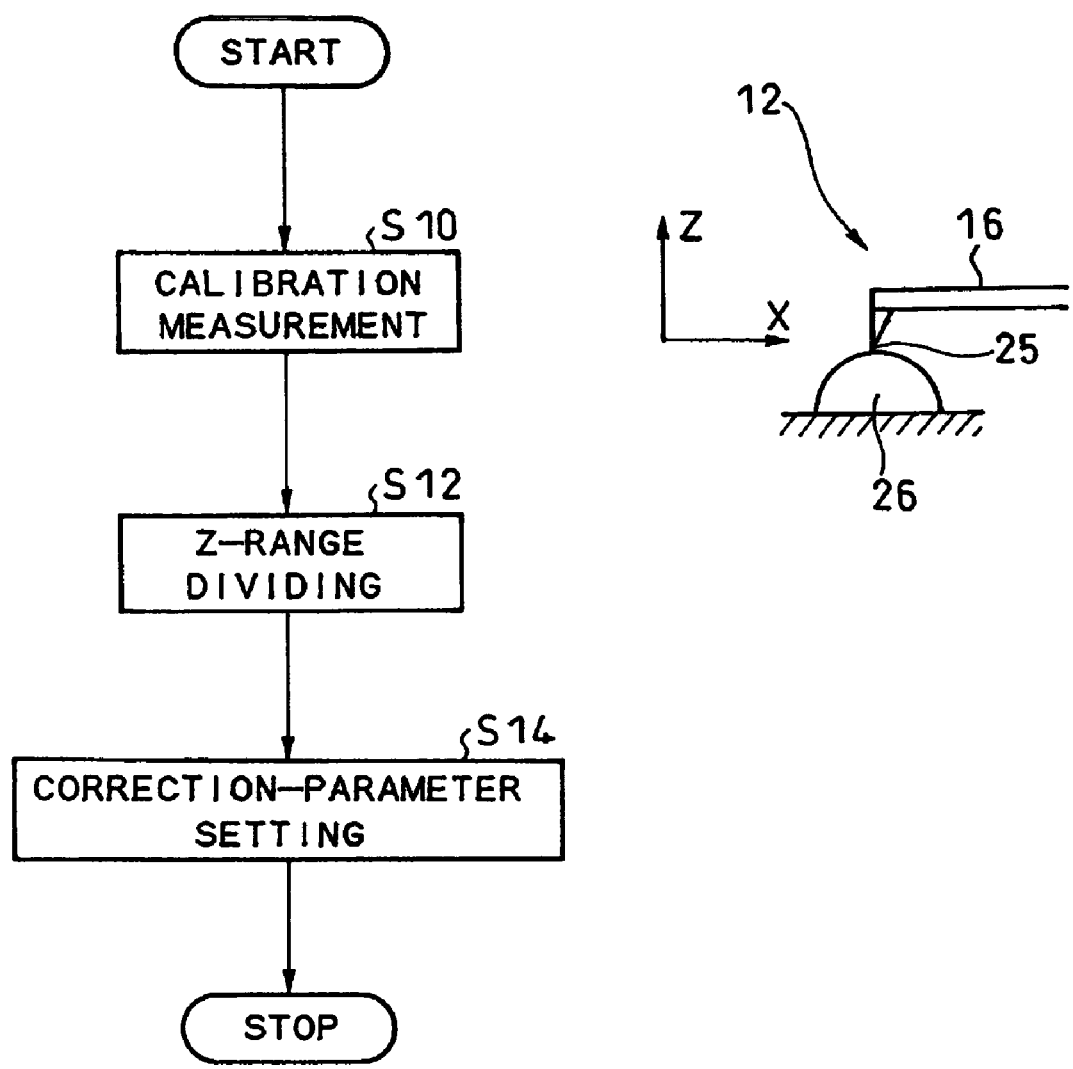
FIG. 2A and FIG. 2B are flowcharts of correction procedures according to the present invention, with the first embodiment taken as an example.

In the present embodiment, the correction program 42 causes the computer 38 to execute the calibration measurement process (S10), the Z-range dividing process (S12), and the correction-parameter setting process (S14), as shown in FIG. 2A.

In the calibration measurement process (S10), while the position at which the stylus tip 25 of the pivot-type stylus 12 traces the reference workpiece 26 is moved along the X axis by the feed device 22, the X-axis movement distance information and the Z-axis displacement information of the stylus tip 25 are simultaneously obtained according to the X-axis movement distance information and the Z-axis displacement information output from the pickup unit 14. More specifically, the X-axis movement distance information and the Z-axis displacement information of the pivot-type stylus 12 are obtained based on the X-axis movement distance output from the X-axis detector 24 and the Z-axis displacement output from the Z-axis detector 20.

The reference workpiece 26 here is a sphere having a known radius and is one which is close to an ideal sphere having a precision finished surface. The XZ coordinates of the pivot-type stylus 12 are obtained according to the X-axis movement distance information and the Z-axis displacement information of the stylus 12. Calibration measurement data is obtained from the XZ coordinates.

In the first embodiment, calibration measurement is performed only with the reference workpiece 26 to reduce the calibration measurement period, to reduce costs by providing a simplified calibration jig, and to improve the usability thereof.

In the Z-range dividing process (S12), the Z range (measurement range in the height directions) that can be measured by the pivot-type stylus 12 is divided into a plurality of sectors.

In the first embodiment, even when the pivot-type stylus 12 moves along a circular arc, since a multilayer style algorithm, which is a feature of the present invention, and which includes, for example, the Z-range dividing process (S12), is employed, the movement of the pivot-type stylus 12 can be appropriately modeled, including a state in which the actual circular-arc movement deviates from an ideal circular-arc movement.

Therefore, the measurement error caused by the deviation of the actual circular-arc movement of the pivot-type stylus 12 from the Z axis can be more correctly obtained. The measurement error can thereby be more appropriately corrected.

In the correction-parameter setting process (S14), the calibration measurement data obtained in the calibration measurement process (S10) is compared with information on the reference shape (circle) of the reference workpiece in the XZ plane. An optimum correction parameter value for correcting the measurement error caused by the circular-arc movement of the pivot-type stylus 12 is estimated and set. A correction parameter value for each sector generated by the division in the Z-range dividing process (S12) and a correction parameter value common to all the sectors are simultaneously estimated.

A nonlinear least-squares method is used for the comparison, and all correction parameter values necessary for correction can be calculated simultaneously. With just one calibration measurement of the reference workpiece, all the correction parameter values can be simultaneously obtained, improving correction efficiency.

An optimum correction parameter value can be specified for each sector in the correction-parameter setting process (S14).

Figure 2B:
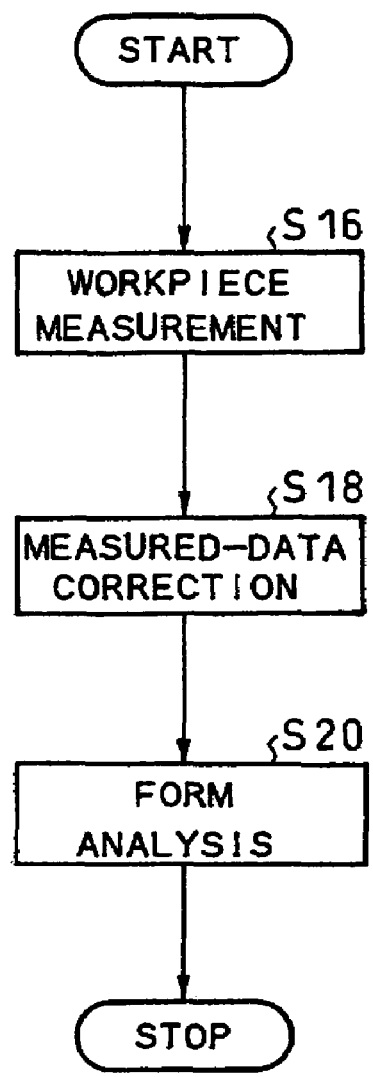

The correction program 42 also causes the computer 38 to execute a workpiece measurement process (S16), a measured-data correction process (S18), and a form analysis process (S20), as shown in FIG. 2B.

In the workpiece measurement process (S16), the measurement-target workpiece 36 whose shape is to be measured is placed, instead of the reference workpiece 26, in the form measuring instrument 10, and it is measured by the pickup unit 14.

In the measured-data correction process (S18), measured data obtained in the workpiece measurement process (S16) is corrected for each sector by the optimum correction parameter value specified.

More specifically, in the measured-data correction process (S18), according to information on the Z coordinate of measured data output from the pickup unit 14, a sector "i", to which the measured data belongs, is identified. The optimum correction parameter value for the identified sector "i" is selected from correction parameter values obtained in the correction-parameter setting process (S14). The measured data ($X_k^m$, $Z_k^m$) output from the pickup unit 14 is corrected by using the selected optimum correction parameter value for the identified sector "i" to obtain corrected data ($X_k^r$, $Z_k^m$).

Data measured by the pivot-type stylus 12 is corrected by the optimum correction parameter in each sector of the Z range. Therefore, an error from a correct measurement position can be corrected more precisely than in a conventional method, in which an identical correction parameter is used for the entirety of the Z range.

This is an advantage of the multilayer style algorithm employed in the first embodiment. The movement of the pivot-type stylus 12 can be more appropriately modeled, including a state in which the actual circular-arc movement deviates from an ideal circular-arc movement. Therefore, measured data can be precisely corrected by correction parameters.

In the form analysis process (S20), the shape of the measurement-target workpiece 36 is obtained based on the corrected data of the measured-data correction process (S18).

With the use of the multilayer style algorithm of the present invention, the shape of the measurement-target workpiece 36 is obtained according to data in which the measurement error caused by the circular-arc movement of the pivot-type stylus 12 has been appropriately corrected. Therefore, form analysis can be performed precisely. This superior advantage is obtained due to the multilayer style algorithm of the present invention, in which an optimum correction parameter value is specified in each of a plurality of sectors obtained by dividing the Z-axis measurement range.

In contrast, it is difficult for the conventional method, that is, a correction method in which one correction parameter is used for the entirety of the Z-axis measurement range, to produce a sufficient correction advantage, unlike in the present invention. In the conventional method, the pickup unit 14 for the pivot-type stylus 12 needs to correct measured data with the circular-arc movement of the stylus arm 16 being taken into account.

In the correction method described in Japanese Patent No. 2,727,067 or Japanese Patent No. 3,215,325, not designed values but effective values obtained by calibration measurement are used for the length of the stylus arm and the height of the stylus edge.

An actual pivot-type stylus does not perform an ideal circular-arc movement because of play at the fulcrum and bending of the stylus arm.

Therefore, in the correction method described in Japanese Unexamined Patent Application No. 2003-500675 and that described in "An algorithm for stylus instruments to measure aspheric surfaces", C. Lee, Meas. Sci. Technol., Vol. 16, pp. 1215-1222, 2005, polynomials which can be expressed by the following expression set 1 are used for correction expressions. A deviation from the ideal circular-arc movement of a pivot-type stylus is modeled as polynomial coefficients.

$$x' = x + A_1 z + A_2 z^2 + \ldots$$

$$z' = B_1 z + B_2 z^2 + B_3 z^3 + \ldots \qquad \text{<Expression Set 1>}$$

where (x, z) indicates measured coordinates, and (x', z') indicates corrected coordinates.

Currently, modeling with the polynomials expressed by Expression Set 1 is most effective. In a situation in which high measurement precision is required, such as for the measurement of aspheric surfaces, a sufficient correction effect has not yet been obtained.

In the conventional method, a correction process in which an identical correction parameter is used for the entirety of the Z-axis measurement range was usually applied to measured data. It was difficult to improve the correction precision further.

In the present invention, the multilayer style algorithm is employed to improve the correction precision further.

A model to which the multilayer style algorithm of the present invention is applied will be described first.

Figure 3:
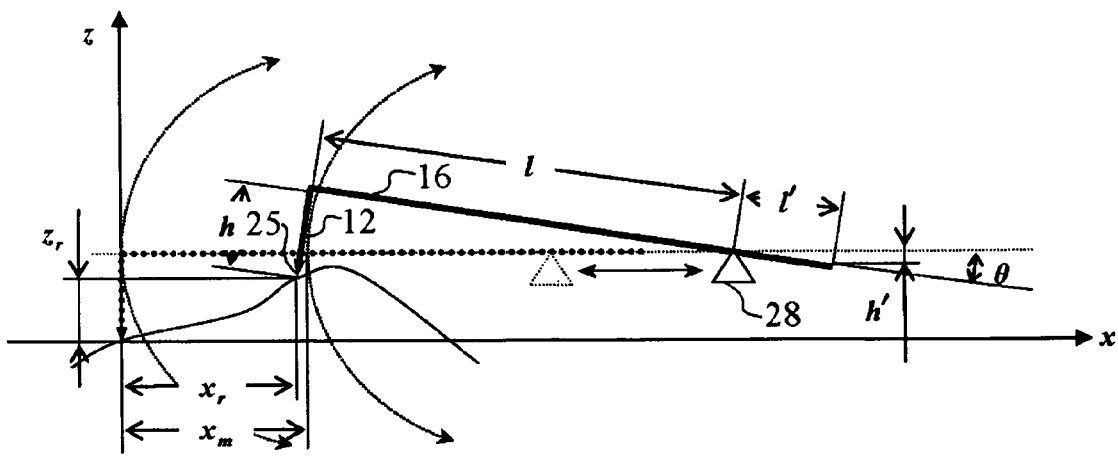
FIG. 3 is a view showing a measurement error to be corrected in the first embodiment, the measurement error caused by a circular-arc movement of a pivot-type stylus.

A measurement position ($x_m$, $z_m$) obtained by the pickup unit 14 for the pivot-type stylus 12 is different from the correct measurement position ($x_r$, $z_r$) due to the influence of the circular-arc movement of the stylus arm 16, as shown in FIG. 3. Therefore, it is necessary to apply an appropriate correction process to the measurement position ($x_m$, $z_m$).

The Z coordinate $z_m$ of the measurement position obtained by the stylus 12 is given by the following expression set 2 with the gain coefficient of the Z axis being indicated by "g".

$$z_m = \frac{lh'}{gl'} = \frac{l \sin\theta}{g} \qquad \text{<Expression Set 2>}$$

The true Z coordinate is given by the following expression set 3.

$$z_r = h - (h \cos\theta - l \sin\theta) = h(1 - \cos\theta) + l \sin\theta \qquad \text{<Expression Set 3>}$$

The relationship expressed by the following expression set 4 is satisfied between the true X coordinate $x_r$ and the X coordinate $x_m$ of the measurement position.

$$x_r - x_m = l - l\cos\theta - h\sin\theta = l(1 - \cos\theta) - h\sin\theta \qquad \text{<Expression Set 4>}$$

Therefore, the correct measurement position ($x_r$, $z_r$) can be expressed by the following expression set 5.

$$x_r = x_m + l\left(1 - \sqrt{1 - \left(\frac{gz_m}{l}\right)^2}\right) - h\frac{gz_m}{l} \qquad \text{<Expression Set 5>}$$

$$z_r = gz_m + h\left(1 - \sqrt{1 - \left(\frac{gz_m}{l}\right)^2}\right)$$

A case in which the multilayer style algorithm of the present invention is applied to the model will be described next.

Figure 4:
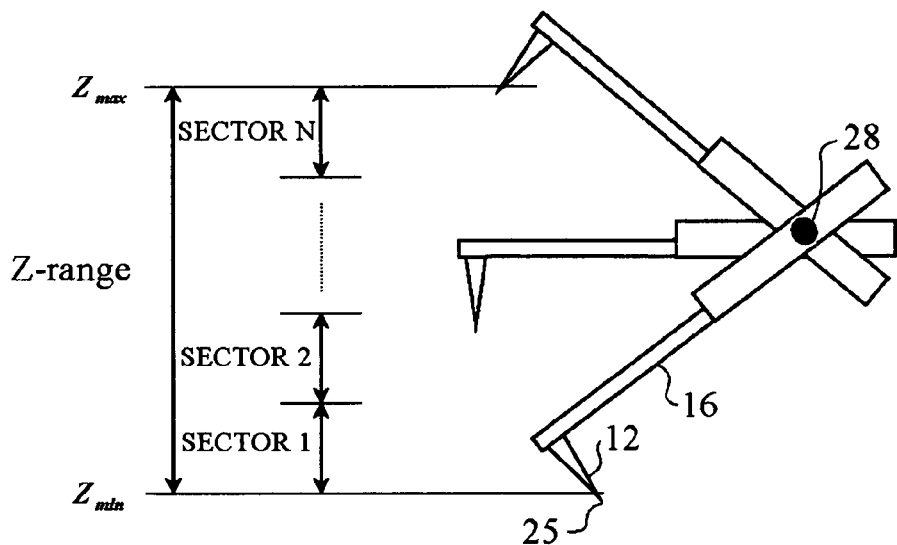
FIG. 4 is a view showing a Z-range dividing process, which is a feature of the present invention, with the first embodiment taken as an example.

A fundamental concept of the multilayer style algorithm is to apply a multilayer structure model shown in FIG. 4 to the model shown in FIG. 3. In other words, the Z-axis measurement range, in which measurement is possible with the pivot-type stylus 12, is divided into a plurality of sectors (sector 1, sector 2, . . . , sector N), and an optimum correction parameter value is specified for each sector.

To apply a circular-arc movement model that can be represented by Expression Set 5, for example, the length "l" of the stylus arm, the height "h" of the stylus edge, and the gain coefficient "g" serve as correction parameters. The correction parameters are specified for each sector.

When the multilayer style algorithm of the present invention is used with a model that can be represented by Expression Set 5 or the like, an advantage of multilayers is obtained. Therefore, the movement of the pivot-type stylus 12 can be more correctly modeled, including a state in which the actual circular-arc movement deviates from an ideal circular arc. Consequently, the present invention provides a correction advantage equal to or greater than that obtained by the methods described in Japanese Unexamined Patent Application No. 2003-500675 and other publications.

A case will next be described in which the multilayer style algorithm of the present invention, shown in FIG. 4, is applied to the model shown in FIG. 3 to estimate correction parameters.

In other words, calibration measurement is performed with a reference sphere to estimate correction parameters.

The reference sphere has a known radius R and is close to an ideal sphere whose surface has been precisely finished. The shape of the tip of the pivot-type stylus 12 (the shape of the stylus tip 25) is assumed to be a sphere. The Z range is also assumed to be divided into a plurality of N sectors (sector 1, sector 2, . . . , sector N). These divisions are not necessarily of equal width.

Correction parameters are estimated such that the sum of the squares of errors between the measurement positions on the reference sphere and calibration measurement positions $(x_k^m, z_k^m)$ where k=1, 2, . . . , n, obtained by measuring the reference sphere by the pivot-type stylus 12 is the minimum.

Assuming that the center coordinates of the reference sphere is $(x_c, z_c)$ and the radius of the tip 25 of the pivot-type stylus 12 is "r", a performance index φ can be represented by the following expression set 6.

$$\varphi = \sum_{k=1}^{n} \left\{ \sqrt{(x_k^r - x_c)^2 + (z_k^r - z_c)^2} - (R+r) \right\}^2 \quad \text{<Expression Set 6>}$$

where $(x_k^r, z_k^r)$ indicates corrected coordinates of the measured data $(x_k^m, z_k^m)$, and can be represented by the following expression set 7 with correction parameters $l_i$, $h_i$, and $g_i$.

$$x_k^r = x_k^m + l_i\left(1 - \sqrt{1 - \left(\frac{g_i z_k^m}{l_i}\right)^2}\right) - h_i \frac{g_i z_k^m}{l_i} \quad \text{<Expression Set 7>}$$

$$z_k^r = g_i z_k^m + h_i\left(1 - \sqrt{1 - \left(\frac{g_i z_k^m}{l_i}\right)^2}\right)$$

It is assumed that the corrected coordinates $(x_k^r, z_k^r)$ fall in the sector "i" of the N sectors obtained by dividing the Z range, and the correction parameters $l_i$, $h_i$, and $g_i$ indicate the length of the stylus arm, the height of the stylus edge, and the gain coefficient in the sector "i".

<Nonlinear Least-squares Method>

The nonlinear least-squares method, which is most suitable for estimating the correction parameters, will be described next.

In the present invention, the least-squares method is used to simultaneously obtain a set of correction parameters ($l_i$, $h_i$, and $g_i$) where i=1, 2, . . . , N, the center coordinates ($x_c$, $z_c$) of the reference sphere, and the radius "r" of the stylus tip which make the performance index φ minimum.

Whereas the gain coefficient and the radius "r" of the stylus tip of the pivot-type stylus are conventionally calibrated by a step standard and a pin gauge, calibrated values thereof can be obtained simply by measuring the reference sphere in the present invention.

Setting initial values, which is important in the nonlinear least-squares method, will be described next.

To appropriately estimate correction parameters by using the nonlinear least-squares method, it is very important to set initial values of the correction parameters. Optimum initial values should be given. If improper initial values of the correction parameters are given, convergence takes a lot of time, and very different solutions are obtained in some cases.

It is preferred that the following initial values of the correction parameters be used in the nonlinear least-squares method.

For example, it is preferred that design values be used as initial values for the radius "r" of the stylus tip 25, the length "$l_i$" (i=1, 2, . . . , N) of the stylus arm, and the height "$h_i$" (i=1, 2, . . . , N) of the stylus edge.

It is preferred that the gain coefficient "$g_i$" (i=1, 2, . . . , N) of the Z axis be set to "1" as an initial value.

It is preferred that the center coordinates ($x_c$, $z_c$) of the reference sphere be set to values obtained by applying the least-squares method to a circle with the performance index represented by the following expression set 8 taken into account, as initial values.

$$\varphi = \sum_{k=1}^{n} \{(x_k^m - x_c)^2 + (z_k^m - z_c)^2 - r_c^2\}^2 \quad \text{<Expression Set 8>}$$

More specifically, initial values of the center coordinates ($x_c$, $z_c$) can be obtained by solving the following expression set 9.

<Expression Set 9>

$$\frac{\partial \varphi}{\partial x_c} = -4\sum_{k=1}^{n} \{(x_k^m - x_c)^2 + (z_k^m - z_c)^2 - r_c^2\}(x_k^m - x_c) = 0$$

$$\frac{\partial \varphi}{\partial z_c} = -4\sum_{k=1}^{n} \{(x_k^m - x_c)^2 + (z_k^m - z_c)^2 - r_c^2\}(z_k^m - z_c) = 0$$

$$\frac{\partial \varphi}{\partial r_c} = -4\sum_{k=1}^{n} \{(x_k^m - x_c)^2 + (z_k^m - z_c)^2 - r_c^2\}r_c = 0$$

Since Expression Set 9 has the relationship represented by the following expression set 10, the following expression set 11 needs to be solved.

<Expression Set 10>

$$r_c^2 = \frac{1}{n}\sum_{k=1}^{n} \{(x_k^m - x_c)^2 + (z_k^m - z_c)^2\}$$

<Expression Set 11>

-continued $$2\left(\sum_{k=1}^{n} x_k^{m2} - n\bar{x}^2\right)x_c + 2\left(\sum_{k=1}^{n} x_k^m z_k^m - n\bar{x}\bar{z}\right)z_c = \sum_{k=1}^{n} (x_k^{m2} + z_k^{m2})(x_k^m - \bar{x})$$

$$2\left(\sum_{k=1}^{n} x_k^m z_k^m - n\bar{x}\bar{z}\right)x_c + 2\left(\sum_{k=1}^{n} z_k^{m2} - n\bar{z}^2\right)z_c = \sum_{k=1}^{n} (x_k^{m2} + z_k^{m2})(z_k^m - \bar{z})$$

Expression Set 11 satisfies the following expression set 12.

$$\bar{x} = \frac{1}{n}\sum_{k=1}^{n} x_k^m$$ <Expression Set 12>

$$\bar{z} = \frac{1}{n}\sum_{k=1}^{n} z_k^m$$

To efficiently estimate parameters with the nonlinear least-squares method, the following Levenberg-Marqurdt method can be used.

When the Levenberg-Marqurdt method is used in calculations of the nonlinear least-square methods, the following expression set 13 is solved, in which a performance index is expressed by $\phi = f^T f$, a Jacobian matrix is expressed by J, and a damping factor is expressed by μ. With this, an update-amount vector ΔX of an unknown parameter is obtained.

$$(J^T J + \mu I)\Delta X = -J^T f$$ <Expression Set 13> where I indicates a unit matrix. Updating the unknown parameter needs to be completed when a convergence condition is satisfied such as that in which the update-amount vector ΔX is sufficiently small or a change in performance index φ is sufficiently small.

More specifically, in case of the following expression set 14, each element of the Jacobian matrix can be obtained from the following expression set 15.

$$f_k = \sqrt{(x_k^r - x_c)^2 + (z_k^r - z_c)^2} - (R + r)$$ <Expression Set 14>

$$k = 1, 2, \ldots, n$$

$$\frac{\partial f_k}{\partial g_i} = p_x \frac{\partial x_k^r}{\partial g_i} + p_z \frac{\partial z_k^r}{\partial g_i}$$ <Expression Set 15>

$$\frac{\partial f_k}{\partial l_i} = p_x \frac{\partial x_k^r}{\partial l_i} + p_z \frac{\partial z_k^r}{\partial l_i}$$

$$\frac{\partial f_k}{\partial h_i} = p_x \frac{\partial x_k^r}{\partial h_i} + p_z \frac{\partial z_k^r}{\partial h_i}$$

$$\frac{\partial f_k}{\partial r} = -1$$

$$\frac{\partial f_k}{\partial x_c} = -p_x$$

$$\frac{\partial f_k}{\partial z_c} = -p_z$$

where the relationships indicated by the following expression set 16 are used in Expression Set 15.

$$p_x = \frac{(x_k^r - x_c)}{\sqrt{(x_k^r - x_c)^2 + (z_k^r - z_c)^2}}$$ <Expression set 16>

-continued $$p_z = \frac{(z_k^r - z_c)}{\sqrt{(x_k^r - x_c)^2 + (z_k^r - z_c)^2}}$$

The unknown parameter can be obtained by updating it successively until the convergence condition is satisfied, with the use of the following expression set 17 by using an update-amount vector $\Delta X^{(m)}$ obtained at the m-th repeated calculation.

$$X^{(m)} = X^{(m-1)} + \Delta X^{(m)}$$ <Expression Set 17> where $X^{(0)}$ indicates an initial value of the unknown parameter.

An example of the result of an experiment conducted to prove the effectiveness of the correction method according to the present invention will be described below.

Figure 5A:
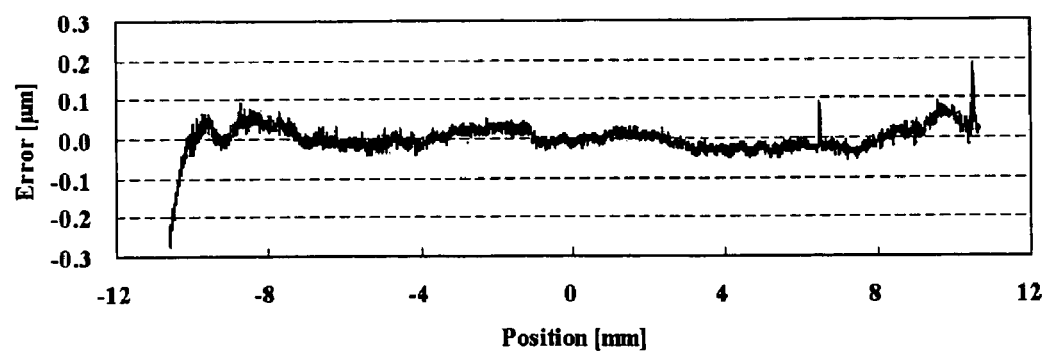
FIG. 5A to FIG. 5C are views showing, in a comparative manner, errors generated when a correction program according to the first embodiment and conventional correction programs are used.
Figure 5B:
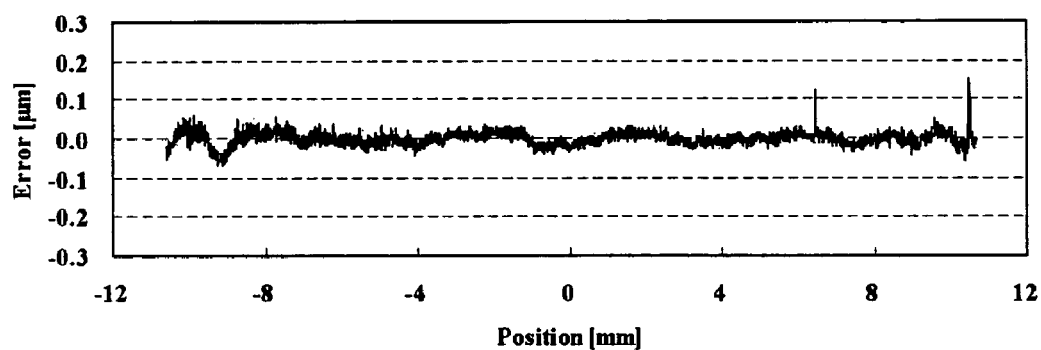
Figure 5C:
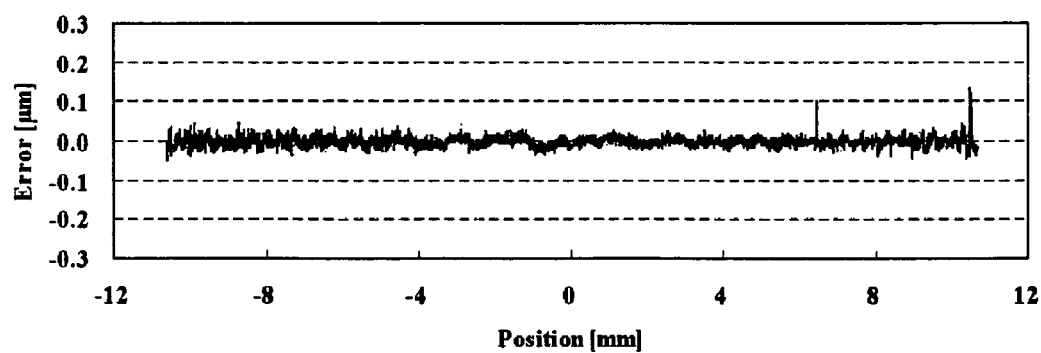

FIG. 5A to FIG. 5C show the results of errors obtained by applying various correction methods to calibration measurement data acquired with a reference sphere having a diameter of one inch, by calculating correction parameters, and applying correction processes to identical measured data, in order to check the correction precision of the correction methods.

FIG. 5A shows errors obtained when a conventional method was used, that is, correction was made in a different calibration procedure with the use of Expression Set 5. FIG. 5B shows errors obtained when a conventional method was used, that is, the method that can be represented by Expression Set 1 was applied. FIG. 5C shows errors obtained when the present invention was applied, that is, the correction expressions represented by Expression Set 7 were applied with the division count N being set to 20.

From the results, the correction method (when the division count N is set to 20 in the correction expressions that can be represented by Expression Set 7) according to the present invention, shown in FIG. 5C, generates significantly smaller errors than the conventional method shown in FIG. 5A (when correction is made with a different calibration procedure with the use of Expression Set 5) and the conventional method shown in FIG. 5B (method that can be represented by Expression Set 1). It is understood that the result obtained by the correction method of the present invention is very precise.

Figure 6A:
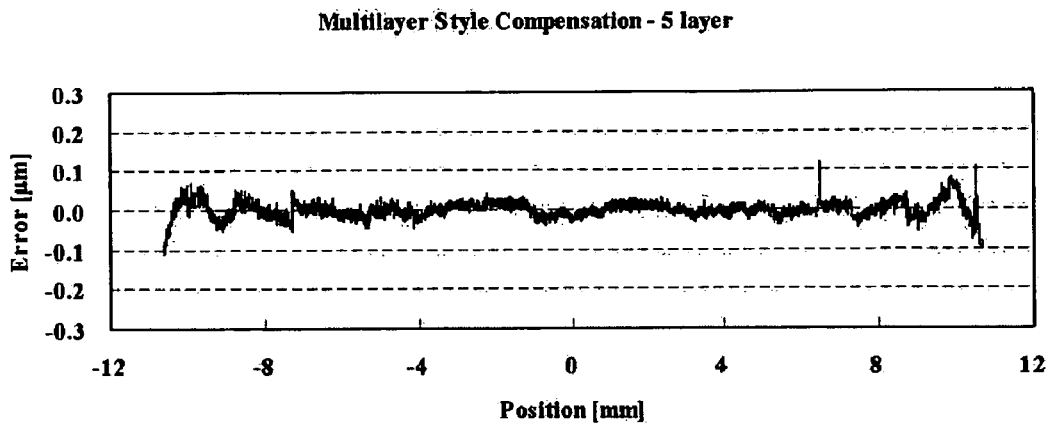
FIG. 6A to FIG. 6C are views showing, in a comparative manner, errors generated when different division counts of the Z range are used in the correction program of the first embodiment.
Figure 6B:
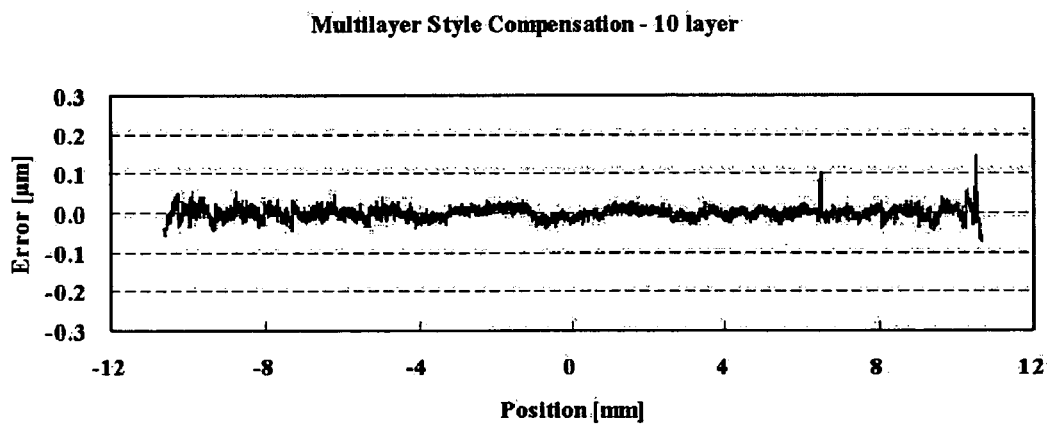
Figure 6C:
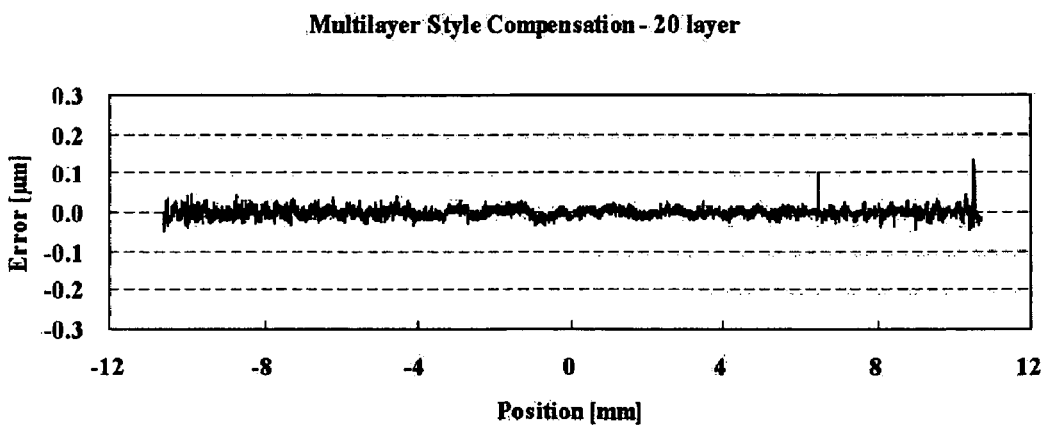

FIG. 6A to FIG. 6C show the results of errors obtained by the correction method according to the present invention with different division counts, in order to check differences caused by the division counts.

FIG. 6A to FIG. 6C show calibration results obtained by the present invention with a reference sphere having a diameter of one inch being used.

FIG. 6A shows errors obtained when the division count N was set to 5 in the correction method (when the correction expressions that can be represented by Expression Set 7 were used) of the present invention. FIG. 6B shows errors obtained when the division count N was set to 10 in the correction method (when the correction expressions that can be represented by Expression Set 7 were used) of the present invention. FIG. 6C shows errors obtained when the division count N was set to 20 in the correction method (when the correction expressions that can be represented by Expression Set 7 were used) of the present invention.

From the results, it is understood that the division count affects errors obtained after correction. When the division count is larger, smaller errors are obtained, providing more precise correction results.

Figure 7:
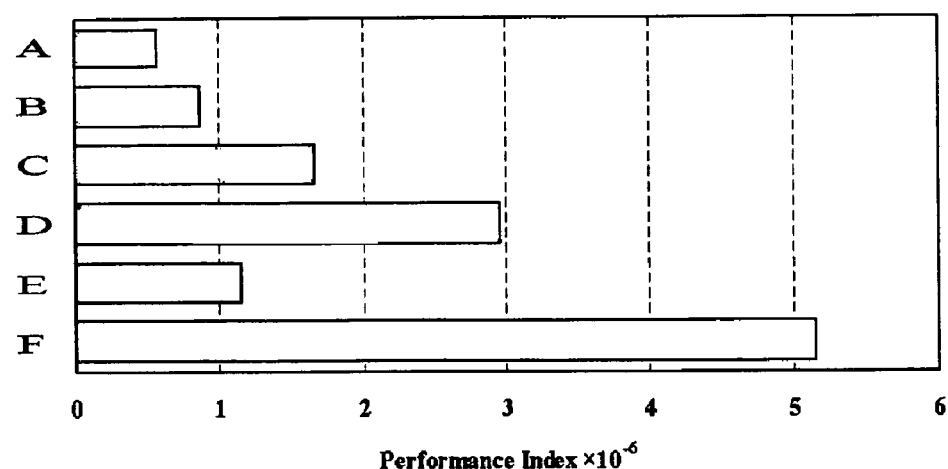
FIG. 7 is a view showing, in a comparative manner, performance indexes obtained when the correction program of the first embodiment and the conventional correction programs are used.

FIG. 7 shows an example of the result of comparison among performance indexes (the sum of the squares of shortest distances) obtained with various correction methods, in order to check effectiveness of the correction method of the present invention.

In FIG. 7, "A" shows a performance index obtained when the division count N was set to 20 in the correction method (the correction expressions that can be expressed by Expression Set 7) of the present invention; "B" shows a performance index obtained when the division count N was set to 10 in the correction method (the correction expressions that can be expressed by Expression Set 7) of the present invention; "C" shows a performance index obtained when the division count N was set to 5 in the correction method (the correction expressions that can be expressed by Expression Set 7) of the present invention; "D" shows a performance index obtained when the division count N was set to 1 in the correction method (the correction expressions that can be expressed by Expression Set 7) of the present invention; "E" shows a performance index obtained when a conventional method (method that can be expressed by Expression Set 1) was used; and "F" shows a performance index obtained when a conventional method was used, that is, correction was made with a different calibration procedure with the use of Expression Set 5.

From the results shown in FIG. 7, it was found that when the division count is set to 10 (indicated by "B") in the correction method of the present invention, the same advantage as shown in "E", which is obtained by the method described in Japanese Unexamined Patent Application No. 2003-500675 is obtained. It is understood that, as shown in "A" of FIG. 7, increasing the division count to 20 improves the correction advantage further in the correction method of the present invention.

In theory, the larger the division count, the higher the correction advantage. However, if the division count is set very high, since the number of data items in each sector decreases, stability of the calculation results is impaired. Therefore, the division count should not be set higher than necessary.

For example, it is preferred in the present invention that the division count N in the Z range in Expression Set 7 fall in the range from 10 (inclusive) through 50 (inclusive).

If the division count N in the Z range is set to be less than 10, a sufficient correction advantage, greater than that obtained by the method represented by Expression Set 1, may not be obtained. If the division count N is set to be greater than 50, stability of calculation results may be impaired.

According to the correction method of the present invention, the correction program 42, and the form measuring instrument 10 of the first embodiment, the multilayer style algorithm is employed to estimate optimum correction parameters used to correct the measurement errors caused by the circular-arc movement of the pivot-type stylus. With this, data measured by the pivot-type stylus can be corrected precisely.

Instead of a conventional calibration measurement performed with a special unit, calibration measurement can be preformed with only a reference sphere in the present invention. In this way, the calibration measurement period is reduced, a less expensive measurement is performed due to the simplified calibration jig, and usability is improved.

In addition, in the present invention, since the nonlinear least-squares method is employed to estimate correction parameters, all correction parameters can be calculated with one calibration measurement. In this way, efficient acquisition of optimum correction parameters can be performed.

<Modifications>

In the first embodiment, a case (a model represented by Expression Set 7) in which the measurement-range dividing process (measurement-range divider) and the measured-data correction process (measured-data correction unit), which are features of the present invention, are applied to the circular-arc movement model that can be represented by Expression Set 5 has been described. The present invention is not limited to this case. For example, the measurement-range dividing process (measurement-range divider) and the measured-data correction process (measured-data correction unit), which are features of the present invention, can be applied to general correction methods for data measured with a stylus to provide precise correction results. The present invention can also be applied to the method (model describing a deviation from an ideal stylus movement) described in Expression Set 1.

In the first embodiment, the Z range is divided every time calibration is made. The present invention is not limited to this case. The sectors obtained by the previous division can be used.

When the Z range is divided every time calibration measurement is performed, for example, the range between the minimum value and the maximum value of the Z coordinates obtained by calibration measurement can be divided into a plurality of sectors. In that case, it is preferred that a reference surface of a reference workpiece have a height range equal to or wider than a desired measurement range selected according to the height range of a measurement surface of a measurement-target workpiece whose shape is to be measured. In this way, the measurement error caused by the circular-arc movement of the pivot-type stylus can be reliably corrected in the height range of the measurement-target workpiece.

When the plurality of sectors obtained by previously dividing the Z range of the pivot-type stylus (mechanical performance) is used, it is not necessary to divide the Z range every time calibration measurement is performed.

In the first embodiment, a case in which calibration is performed with a reference sphere having a known radius R has been described. Even if the radius R of the reference sphere is not correctly determined, when the radius "r" of the stylus tip is known (for example, when a calibration value obtained by measurement with a conventional pin gauge can be used), the same theoretical reasoning can be performed with the radius R of the reference sphere being regarded as an unknown parameter instead of the radius "r" of the stylus tip.

Second Embodiment

Linearly Moving Stylus

In the first embodiment, a case in which the pivot-type stylus is used has been described. The present invention is not limited to this case. It is also preferred that a linearly moving stylus be used. In this way, the measurement error caused by the straightness deviations of the straight movement of the linearly moving stylus in an XZ plane can be corrected very successfully.

A case in which the present invention is applied to a linearly moving stylus will be described below.

Figure 8:
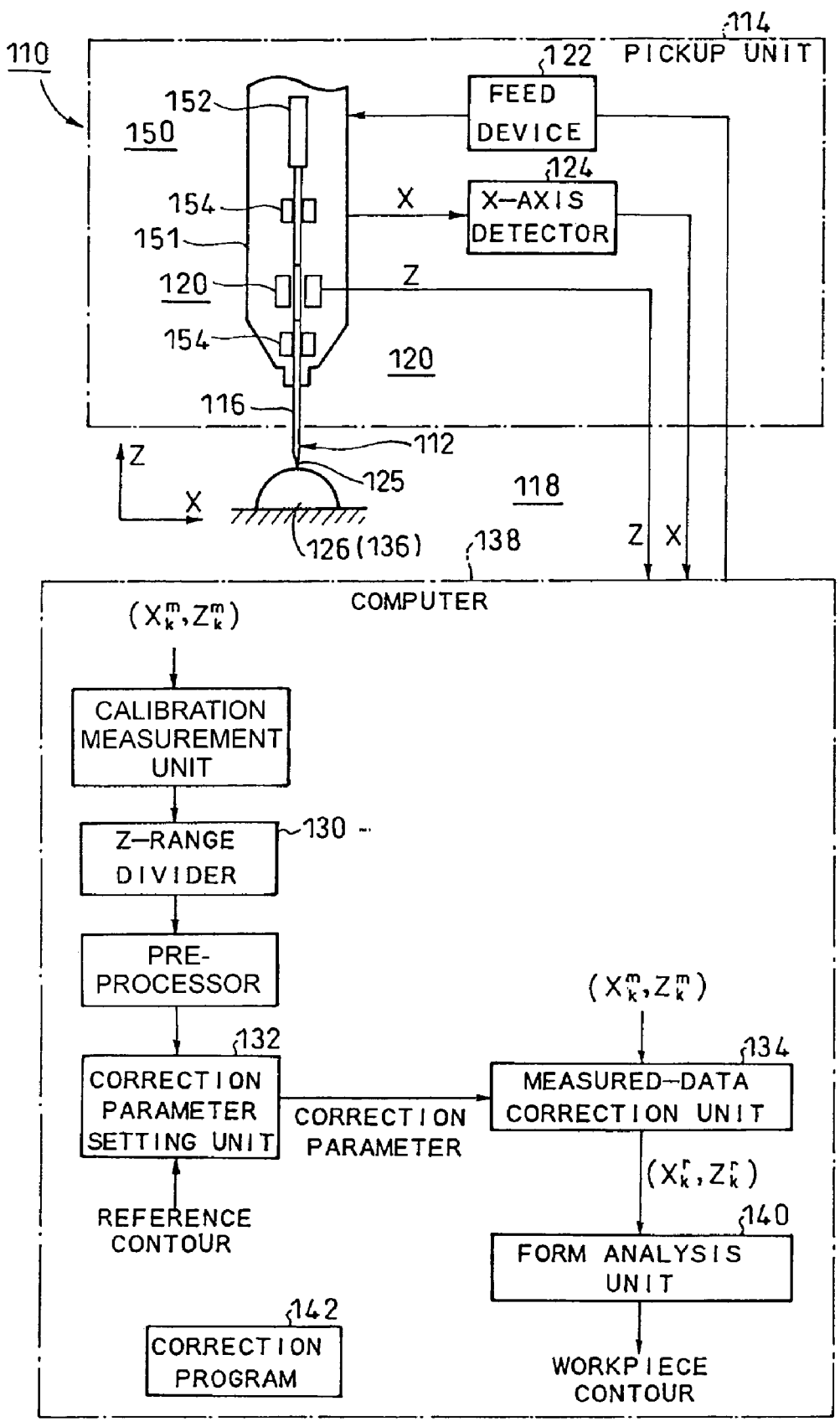
FIG. 8 is a view showing a measurement apparatus according to a second embodiment of the present invention.

FIG. 8 shows an outline structure of a measurement apparatus for correction according to a second embodiment of the present invention. Portions corresponding to those in the first embodiment are indicated by reference numerals, incremented by 100, corresponding to those used in the first embodiment, and a description thereof is omitted here.

In FIG. 8, a form measuring instrument 110 includes a linearly moving stylus 112 and a correction section 118. The correction section 118 corrects the measurement error caused by the straightness deviations of the straight movement of the linearly moving stylus 112 in an XZ plane in a correction process. The correction section 118 includes a pickup unit 114, and the pickup unit 114 operates for the linearly moving stylus 112.

In the second embodiment, when a tip 125 of the linearly moving stylus 112 traces a reference workpiece 126 (or a measurement-target workpiece 136 having an unknown shape, serving as a target for shape measurement) along the X axis, the linearly moving stylus 112 moves along a straight line (moves up and down) in the XZ plane following the height of the workpiece.

In a calibration measurement process, while the tip 125 of the linearly moving stylus 112 traces the reference workpiece 126 along the X axis, the pickup unit 114 outputs calibration measurement data that includes X-coordinate information and Z-coordinate information.

In the second embodiment, in addition to the pickup unit 114, the correction section 118 includes a measurement-range divider 130, a correction-parameter setting unit 132, a measured-data correction unit 134, a form analysis unit 140, and a correction program 142.

The measurement-range divider 130 divides the measurement range along the Z axis into a plurality of sectors in a measurement-range dividing process.

The correction-parameter setting unit 132 compares the calibration measurement data obtained by the pickup unit 114 with reference-shape information of the reference workpiece 126 in the XZ plane, in a correction-parameter setting process. The correction-parameter setting unit 132 then obtains a correction parameter value which is optimal to correct the measurement error caused by the straightness deviations of the straight movement of the linearly moving stylus 112 for each of the plurality of sectors generated by the measurement-range divider 130, simultaneously.

Based on the Z coordinate of measured data obtained when the tip 125 of the linearly moving stylus 112 traces the measurement-target workpiece 136 along the X axis and output from the pickup unit 114, the measured-data correction unit 134 identifies the sector in which the measured data falls, in a measured-data correction process. The measured-data correction unit 134 selects an optimum correction parameter value for the identified sector in which the measured data falls, among the correction parameter values obtained by the correction-parameter setting unit 132, and corrects the measured data with the selected correction parameter value.

In the second embodiment, the pickup unit 114 for the linearly moving stylus 112 includes a straight-movement mechanism 150, a Z-axis detector 120, a feed device 122, and an X-axis detector 124.

The straight-movement mechanism 150 holds the linearly moving stylus 112 with respect to a probe body 151 in the XZ plane such that the stylus 112 can move straightly, in order that the stylus 112 follows the height of the workpiece 126 (or 136) in its straight movement.

To implement the above, the straight-movement mechanism 150 includes a spring 152 and straight guides 154.

The spring 152 makes the linearly moving stylus 112 follow the height of the workpiece 126 (or 136) in its straight movement.

The straight guides 154 restrict the movement of the linearly moving stylus 112 with respect to the probe body 151 to predetermined straight directions.

The Z-axis detector 120 detects the Z coordinate of the linearly moving stylus 112, which follows the height of the workpiece 126 (or 136) in its straight movement.

The feed device 122 feeds the linearly moving stylus 112 on the workpiece 126 (or 136) along the X axis.

The X-axis detector 124 detects the feed distance of the linearly moving stylus 112 along the X axis.

In the same way as in the first embodiment, the correction program 142 causes a computer 138 to execute each process.

The form measuring instrument 110 in the second embodiment is configured in outline as described above. Operation thereof will be described below.

When the stylus tip 125 of the linearly moving stylus 112 is moved on the workpiece 126 (or 136) along the X axis, the stylus 112 is moved straight in the XZ plane following the height of the workpiece 126 (or 136). The measurement error caused by the straightness deviations of the movement of the linearly moving stylus 112 can be corrected.

As the linearly moving stylus 112 is fed along the X axis, the stylus tip 125 traces the workpiece 126 (or 136) along the X axis.

While the stylus 112 is moved in the XZ plane, calibration measurement data (XZ-cross-sectional shape information) is obtained. This calibration measurement data includes information on the positioning shift of the tip 125 of the stylus 112, corresponding to the Z position of the tip 125 of the stylus 112.

Figure 9:
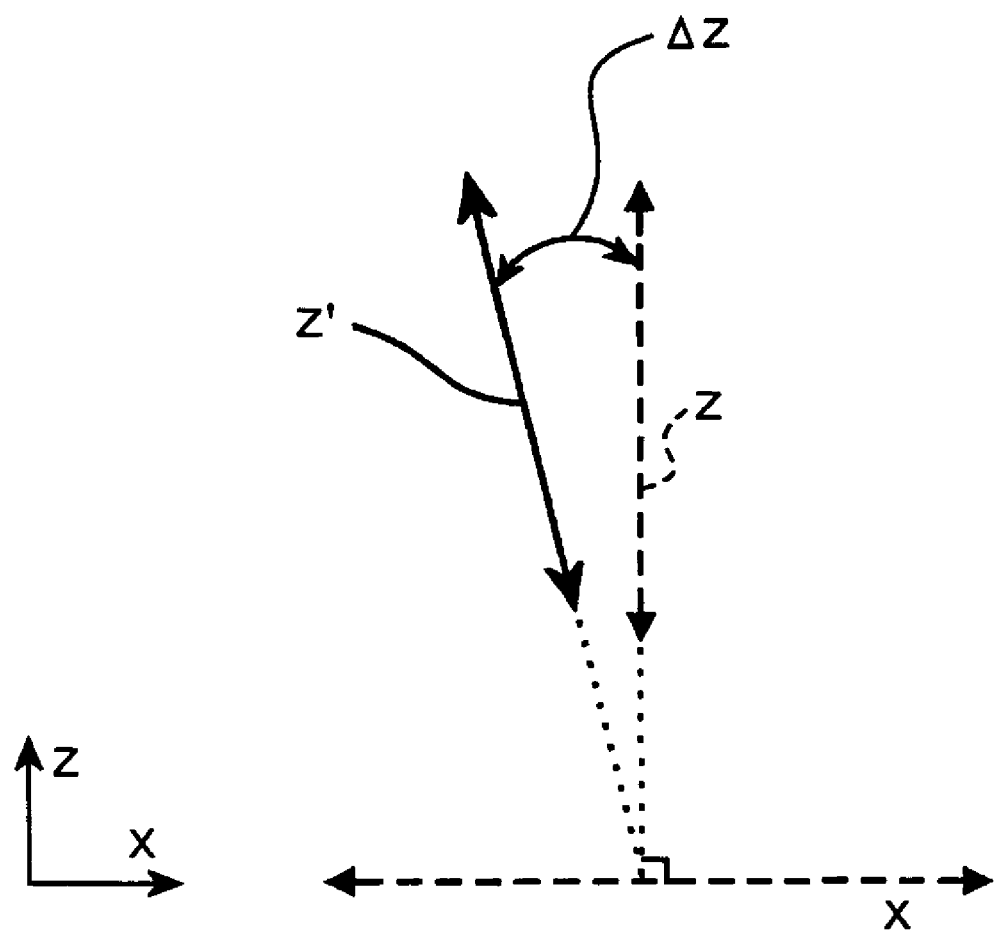
FIG. 9 is a view showing an operation of the measurement apparatus shown in FIG. 8.

When the linearly moving stylus 112 moves straight along the Z axis in the XZ plane, it follows a trajectory in the Z directions indicated by arrows in FIG. 9. If the stylus 112 moves ideally, data output from the pickup unit 114 does not include the measurement error caused by straightness deviations.

However, the actual straight movement (in the directions indicated by "Z'" in FIG. 9) of the stylus 112 usually deviates from the ideal direction. The actual movement directions ("Z'") are shifted from the ideal movement directions ("Z") in the XZ plane, and this shift causes measurement errors.

Data output from the pickup unit 114 differs from values at the correct measurement position due to the shift $\Delta z$ of the movement of the linearly moving stylus 112 in the XZ plane. An object of the present invention is to appropriately correct even such a measurement error.

To achieve this object, the multilayer style algorithm is employed as a feature in the second embodiment to correct data output from the pickup unit 114 for the linearly moving stylus 112.

In the calibration measurement process, when the feed device 122 moves the linearly moving stylus 112 along the X axis, the linearly moving stylus 112 traces the reference workpiece 126 along the X axis, and calibration measurement data is obtained. The calibration measurement data includes the X-coordinate and Z-coordinate of the linearly moving stylus 112, output from the pickup unit 114.

In the correction-parameter setting process, the correction-parameter setting unit 132 compares the calibration measurement data with the reference-shape information of the reference workpiece 126 in the XZ plane. The correction-parameter setting unit 132 then obtains a correction parameter value which is optimal to correct the measurement error caused by the straightness deviations of the straight movement of the linearly moving stylus 112 for each of the plurality of sectors of the Z range, simultaneously.

The correction-parameter setting unit 132 estimates an actual operation trajectory drawn by the linearly moving stylus 112 in the XZ plane, according to the calibration measurement data. The correction-parameter setting unit 132 also estimates an ideal operation trajectory of the linearly moving stylus 112 in the XZ plane, according to the reference shape of the reference workpiece 126.

The correction-parameter setting unit 132 compares the actual operation trajectory with the ideal operation trajectory. In this way, the correction-parameter setting unit 132 estimates a shift of the stylus tip 125 along the X axis with respect to the Z position of the linearly moving stylus 112, and it obtains a correction parameter which is optimal to correct the estimated shift.

In a measured-data correction process, based on the Z coordinate of measured data obtained when the tip 125 of the linearly moving stylus 112 traces the measurement-target workpiece 136 and output from the pickup unit 114, the measured-data correction unit 134 identifies the sector in which the measured data falls, and selects an optimal correction parameter value in the identified sector in which the measured data falls, among the correction parameter values obtained by the correction-parameter setting unit 132.

Then, the measured-data correction unit 134 corrects the measured data, output from the pickup unit 114, with the selected correction parameter value.

As described above, the second embodiment employs the multilayer style algorithm, which is a feature of the present invention, as the first embodiment. Therefore, in the second embodiment, the measurement error caused by the straightness deviations of the straight movement of the linearly moving stylus 112 in the XZ plane can be more appropriately corrected than when an algorithm other than the multilayer style algorithm is employed.

Even when measurement data $(x_m, z_m)$ obtained from the pickup unit 114 for the linearly moving stylus 112 is different from the correct measurement data $(x_r, z_r)$ due to an effect caused by the straightness deviations of the movement of the linearly moving stylus 112, the measurement data can be appropriately corrected.

<Stability of Multilayer Style Algorithm>

To further improve the correction precision of data measured by a stylus, it is very preferred in the present invention (in the first embodiment and the second embodiment) that the multilayer style algorithm be further stabilized.

The inventors further researched stability of the multilayer style algorithm of the present invention, and they found that it was very effective to take the following points into account.

(1) Extreme sensitivity to an outlier included in calibration measurement data.

(2) Stepwise corrected data is generated when a parameter-value difference is large between adjacent layers (adjacent sectors).

(3) The results are apt to be affected by initial values of stylus information.

(4) Noise aspects differ depending on the types of reference spheres.

In other words, in the present invention, an outlier included in data used for calibration, the nature of a reference sphere, and the precision of stylus design values given as calculation initial values may affect the stability of correction parameters.

Figure 10A:
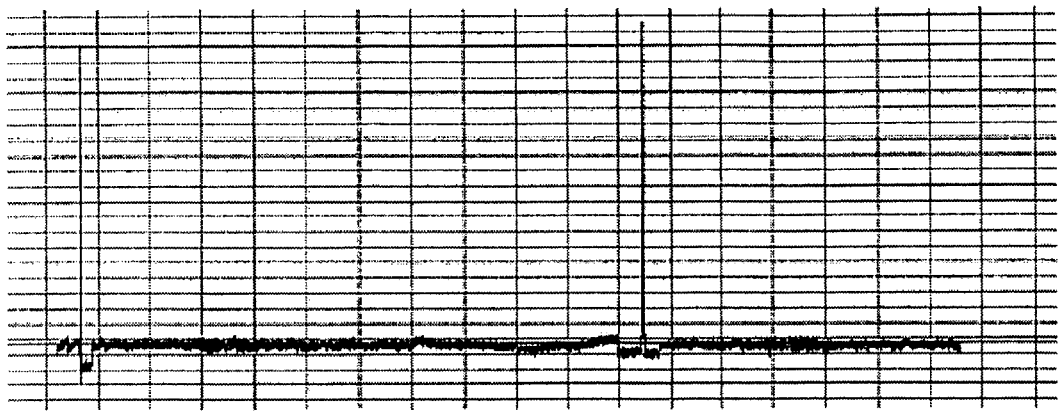
FIG. 10A and FIG. 10B are views showing, in a comparative manner, correction results obtained when an improved multilayer style algorithm according to the present invention is applied and when that algorithm is not applied.

When correction parameter values are determined in a state in which very close attention is paid to an outlier included in calibration measurement data, a difference may occur in parameter values between a layer (sector) that includes the outlier and a layer (sector) having no outlier and adjacent thereto. As a result, as shown in FIG. 10A, steps are generated in the correction result. In addition, the radius of the stylus tip may substantially deviate from a nominal value (250 μm) due to the influence of the outlier.

To reduce such an adverse influence on the stability of correction parameters, in other words, to obtain stable correction parameters even if calibration measurement data is slightly degraded, it is very preferred in the present invention that the following improvements be applied to the multilayer style algorithm of the present invention. In the present invention, the obtained algorithm is called an improved multilayer style algorithm.

(1) Introduction of Robust Processing Using an M Estimation Method

Figure 2B:
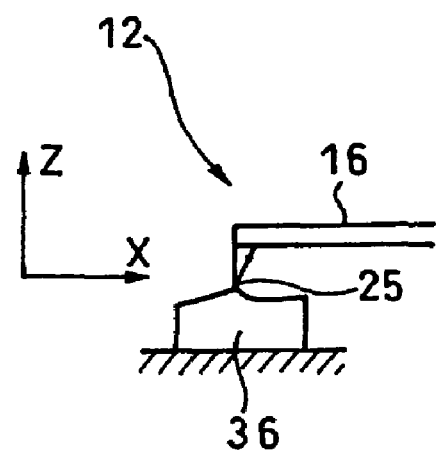

To further stabilize the multilayer style algorithm, it is preferred in the present invention that correction parameter values be estimated such that a correction-parameter setting process (correction-parameter setting process (S14) in FIG. 2) and a correction-parameter setting unit (correction-parameter setting unit 32 in FIG. 1 or correction-parameter setting unit 132 in FIG. 8) according to the present invention use a robust estimation method to minimize the degree of influence caused by outlier on the calculation of the correction parameter values.

(2) Applying a Constrained Condition to Layer (Sector) Parameters

It is preferred in the present invention that the following point be taken into account in order to further stabilize the multilayer style algorithm. When the correction-parameter setting process (S14), the correction-parameter setting unit 32 in FIG. 1, and the correction-parameter setting unit 132 in FIG. 8 obtain correction parameter values, it is preferred that a constrained condition be applied to correction parameter values between adjacent layers (sectors) so as not to generate a difference in correction parameter values between the adjacent layers (sectors), greater than a predetermined value, and also that correction parameter values between the layers be associated with each other.

(3) Adding a Pre-process for Optimizing an Initial Value

To further stabilize the multilayer style algorithm, it is further preferred in the present invention that a pre-process (pre-processor) be provided.

The pre-process (pre-processor) is provided prior to the correction-parameter setting process (correction-parameter setting unit). The function of the pre-process (pre-processor) is included in the correction-parameter setting process (correction-parameter setting unit). The correction-parameter setting process (S14) in FIG. 2, the correction-parameter setting unit 32 in FIG. 1, and the correction-parameter setting unit 132 in FIG. 8 have the function of the pre-processing (pre-processor).

The pre-process (pre-processor) optimizes a design value (initial value) received from the outside. The correction-parameter setting process uses the design value optimized by the pre-process as the initial value to obtain the correction parameter.

Objects and specific contents of the improvements (1) to (3) will be described below.

(1) Introduction of Robust Processing Using the M Estimation Method

The introduction of robust processing minimizes the influence of an outlier. When a reference sphere having a low noise level is used, robust processing is performed with a strict threshold, allowing highly precise estimation of a parameter value.

More specifically, a weight $w_k$ is introduced with respect to the performance index $\phi$ to obtain the following expression set 18. The weight $w_k$ is updated by the Biweight method of Tukey, or other methods.

$$\phi = \sum_{k=1}^{n} w_k \left\{ \sqrt{(x_k^r - x_c)^2 + (z_k^r - z_c)^2} - (R+r) \right\}^2 \quad \text{<Expression Set 18>}$$

(2) Applying a Constrained Condition to Layer (Sector) Parameters

A constrained condition is applied to parameters in layers to associate the parameters with each other. With this, control is made such that parameters do not have an extreme difference between adjacent layers. Consequently, a parameter in one layer is prevented from greatly deviating from others, so that corrected data is connected smoothly.

More specifically, a constrained item that can be represented by the following expression set 19 is applied to the performance index $\phi$.

$$\psi = \lambda_g \sum_{i=1}^{N} \|g_{i+1} - 2g_i + g_{i-1}\|^2 + \quad \text{<Expression Set 19>}$$

$$\lambda_l \sum_{i=1}^{N} \|l_{i+1} - 2l_i + l_{i-1}\|^2 +$$

$$\lambda_h \sum_{i=1}^{N} \|h_{i+1} - 2h_i + h_{i-1}\|^2$$

where $l_i$, $h_i$, and $g_i$ indicate the length of the stylus arm, the height of the stylus edge, and the gain coefficient in sector "i" (i=1, 2, ..., N), respectively; and $\lambda_g$, $\lambda_l$, and $\lambda_h$ indicate constants that control association degrees. A boundary condition can be both-end fixed or both-end free.

(3) Adding a Pre-process for Optimizing an Initial Value

The effects due to an initial value (design value) specified from the outside is suppressed, and an identical result is obtained when the specified value falls in a certain range. When the precision of an initial value is not high enough, the update amount for the radius of the stylus tip is apt to oscillate in the nonlinear calculation. It is supposed that this is caused by the influence of a strong correlation between the radius of the stylus tip and the edge height. Therefore, in the pre-processing for optimizing the initial value, the update amount of the radius of the stylus tip is separated from the determination of the update amounts of other parameters.

In initial-value optimization, one layer is used, rather than multiple layers. Therefore, since the constrained condition on layer parameters causes no effect, the performance index $\phi$ should be represented by the following expression set 20.

$$\phi = \sum_{k=1}^{n} w_k \left\{ \sqrt{(x_k^r - x_c)^2 + (z_k^r - z_c)^2} - (R+r) \right\}^2 \quad \text{<Expression Set 20>}$$

In a first stage, the Gauss-Newton method is used with an initial value being set to a stylus design value given from the outside, and an update-amount vector $\Delta X$ is obtained with the modified Marqurdt method, that is, by solving the following expression set 21 to acquire an initial value which is closer to the solution.

$$(J^T J + \mu I)\Delta X = -J^T f \quad \text{<Expression Set 21>}$$

where $\phi = f^T f$ and J indicates a Jacobian matrix.

In a second stage, the Newton method, which has a second-order convergence, is used with an initial value being set to the result obtained in the first stage, and as in the first stage, the update-amount vector $\Delta X$ is obtained with the modified Marqurdt method, that is, by solving the following expression set 22 to further optimize the initial value.

$$(\phi'' + \mu I)\Delta X = -\phi' \quad \text{<Expression Set 22>}$$

In the above procedure, the radius of the stylus tip is not included in the parameters to be updated, and parameter values other than the radius of the stylus tip are updated. Then, the radius is obtained by a weighted least-squares method with the use of the updated parameters. Since the updated parameters include the center coordinate of the circle, this is a problem of determining a least-squares circle with the center fixed and the radius unknown. Therefore, the following expression set 23 is given because the center coordinates ($x_c$, $z_c$) are known and an unknown parameter (R+r) is to be obtained in a problem of applying the weighted least-squares method to a circle with the performance index represented by the following expression set 23 being used as a performance index.

$$R + r = \frac{\sum_{k=1}^{n} w_k \sqrt{(x_k - x_c)^2 + (z_k - z_c)^2}}{\sum_{k=1}^{n} w_k} \quad \text{<Expression Set 23>}$$

The nominal radius value R of the reference sphere is subtracted from the obtained radius value (R+r) to obtain the radius "r" of the stylus tip.

When the initial values obtained in the above procedure are used, an advantage is given that extrapolation of parameter values outside the calibration measurement Z range becomes stable, and this would have been unstable before the improved multilayer style algorithm was applied.

Figure 10B:
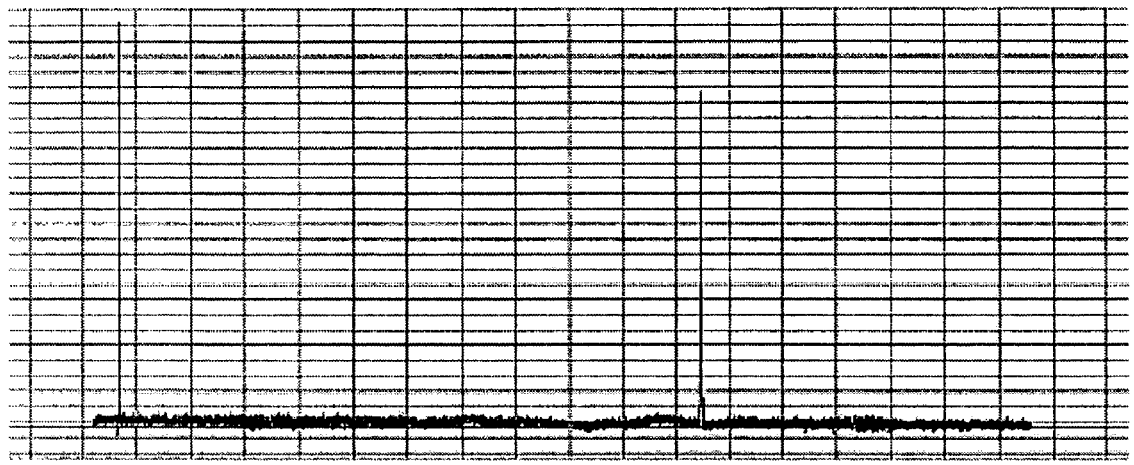

As a result, the correction result is improved more in FIG. 10B, which shows the correction result obtained when the improved multilayer style algorithm is applied to data measured with the pivot-type stylus, than in FIG. 10A, which shows the correction result obtained when the improved multilayer style algorithm is not applied. More specifically, FIG. 10B shows the correction result obtained when robust processing is applied, a constrained condition is applied, and initial values are optimized to stabilize the improved multilayer style algorithm. The obtained radius of the stylus tip is 250.21 μm, which is reasonable.

Table 1 below shows diameter values obtained by the minimum zone method from data obtained by correcting values of a sphere having a diameter of 2 mm (nominal value is 2.0002 mm) measured after calibration, by the multilayer style algorithm. It is clear from Table 1 that results very close to the nominal value are obtained by the improved multilayer style algorithm.

TABLE 1

| First (time) (mm) | Second (time) (mm) | Average (mm) | Difference from nominal value (μm) |
|---|---|---|---|
| 2.000192 | 2.000263 | 2.000228 | 0.03 |

The computer-executable correction program stored in a computer-readable recording medium may be used as the correction program of this invention. Also, the correction program, which is not stored in the medium, for instance, which is traded on the network, may be used as the correction program of this invention, as well as the correction program stored in the medium.

What is claimed is:

1. A correction method for correcting a measurement error in data obtained when a stylus tip of a stylus of a measurement apparatus that moves following a height of a workpiece traces the workpiece along a measurement axis,
the measurement error having occurred due to stylus movement in a correction target plane defined by the measurement axis and a height direction, and the measurement error targeting a shift of a position of the stylus tip, corresponding to the position of the stylus tip in the height direction in the correction target plane,
the method comprising:
a calibration measurement process of obtaining calibration measurement data that includes shift information on the position of the stylus tip, corresponding to the position of the stylus tip in the height direction while the stylus is moved in the correction target plane; and
a correction-parameter setting process of simultaneously with the calibration measurement process obtaining one or more correction parameter values optimal to correct the shift information on the position of the stylus tip, included in the calibration measurement data obtained in the calibration measurement process, for each of a predetermined number of sectors obtained in advance by dividing a measurement range in the height direction, wherein a division Count N in the measurement range in the height direction is set to a value between 10 and 50.

2. A computer-readable recording medium storing a computer-executable correction program for correcting a measurement error in data obtained when a stylus tip of a stylus of a measurement apparatus that moves following a height of a workpiece traces the workpiece along a measurement axis,
the measurement error having occurred due to stylus movement in a correction target plane defined by the measurement axis and a height direction, and the measurement error targeting a shift of a position of the stylus tip, corresponding to the position of the stylus tip in the height direction in the correction target plane,
the program causing a computer to execute a process comprising:
a calibration measurement process of obtaining calibration measurement data that includes shift information on the position of the stylus tip, corresponding to the position of the stylus tip in the height direction while the stylus is moved in the correction target plane; and
a correction-parameter setting process of simultaneously with the calibration measurement process obtaining a correction parameter value optimal to correct the shift information on the position of the stylus tip, included in the calibration measurement data obtained in the calibration measurement process, for each of a predetermined number of sectors obtained in advance by dividing a measurement range in the height direction, wherein a division Count N in the measurement range in the height direction is set to a value between 10 and 50.

3. The computer-readable recording medium storing a computer-executable correction program according to claim 2,
wherein the stylus tip traces a reference workpiece having a reference shape along the measurement axis in order that the stylus is moved in the correction target plane, in the calibration measurement process;
the stylus tip traces the reference workpiece to obtain cross-sectional-shape information in the correction target plane in order to obtain the shift information on the position of the stylus tip, corresponding to the position of the stylus tip in the height direction, in the calibration measurement process; and
the calibration measurement data in the correction target plane is compared with reference information on the reference workpiece in order to obtain the correction parameter value, in the correction-parameter setting process.

4. The computer-readable recording medium storing a computer-executable correction program according to claim 3,
wherein, in the correction-parameter setting process,
an actual operation trajectory actually drawn by the stylus in the correction target plane is estimated according to the calibration measurement data,
an ideal operation trajectory of the stylus in the correction target plane is estimated according to the reference shape of the reference workpiece,
the actual operation trajectory is compared with the ideal operation trajectory to produce estimated shift information on the position of the stylus tip, corresponding to the position of the stylus tip in the height direction, and
a correction parameter value optimal to correct the estimated shift information is obtained.

5. The computer-readable recording medium storing a computer-executable correction program according to claim 2, wherein the stylus is a pivot-type stylus performing a circular-arc movement in the correction target plane, and
the correction program corrects a measurement error caused by the circular-arc movement of the pivot-type stylus in the correction target plane.

6. The computer-readable recording medium storing a computer-executable correction program according to claim 5, wherein positions at which the measurement range in the height direction is divided are determined according to a position at which the pivot-type stylus is parallel to the measurement axis.

7. The computer-readable recording medium storing a computer-executable correction program according to claim 2, wherein the stylus is a linearly moving stylus performing straight movement in the correction target plane, and
the correction program corrects a measurement error caused by straightens deviations of the straight movement of the linearly moving stylus in the correction target plane.

8. The computer-readable recording medium storing a computer-executable correction program according to claim 2, wherein a measurement-range dividing process provided prior to the correction-parameter setting process, of dividing the measurement range in the height direction into the predetermined number of sectors, is provided.

9. The computer-readable recording medium storing a computer-executable correction program according to claim 2, wherein a reference sphere which approximates an ideal sphere and having a surface that has been precisely finished is traced as the workpiece to obtain the calibration measurement data in the calibration measurement process.

10. The computer-readable recording medium storing a computer-executable correction program according to claim 2, wherein the calibration measurement data obtained in the calibration measurement process is compared with reference information of a reference workpiece to obtain all the correction parameter values in the correction-parameter setting process.

11. The computer-readable recording medium storing a computer-executable correction program according to claim 2,
wherein a data correction process provided subsequent to the correction-parameter setting process, of correcting measured data obtained when the stylus tip traces a measurement-target workpiece, by using the correction parameter values is provided; and
in the data correction process, among the correction parameter values set in the correction-parameter setting process, a correction parameter value is selected as a selected correction parameter value which is optimum for a sector in which the measured data belongs, the sector being identified by a height value of the measured data, and
the selected correction parameter value is used to correct the measured data.

12. The computer-readible recording medium storing a computer-executable correction program according to claim 2, wherein the correction parameter value is estimated by a robust estimation method such that a degree of influence of outlier included in the calibration measurement data, on a calculation of the correction parameter value is minimized, in the correction-parameter setting process.

13. The computer-readable recording medium storing a computer-executable correction program according to claim 2, wherein, in order not to generate a difference greater than a predetermined value between correction parameter values in adjacent sectors of the sectors when the correction parameter values are obtained, a constrained condition is applied to the correction parameter values in adjacent sectors to associate the correction parameter values in the adjacent sectors with each other.

14. The computer-readable recording medium storing a computer-executable correction program according to claim 2,
wherein a pre-process provided prior to the correction-parameter setting process, of optimizing a design value is provided, and
the correction parameter value is obtained with an initial value being set to the design value optimized in the pre-process, in the correction-parameter setting process.

15. A measurement apparatus including the computer-readable recording medium storing a computer-executable correction program according to claim 2 that is executed, comprising:
the stylus tip that follows the height of the workpiece;
a pickup unit for detecting the position of the stylus tip at least in the height direction; and
a correction unit for correcting a measurement error in data obtained when the stylus tip traces the workpiece along a measurement axis, the correction unit comprising:

a calibration measurement section for obtaining the calibration measurement data that includes the shift information on the position of the stylus tip, corresponding to the position of the stylus tip in the height direction while the stylus is moved in the correction target plane defined by the measurement axis and the height direction;

a correction-parameter setting section for simultaneously with the calibration measurement section obtaining a correction parameter value which is optimal to correct the shift information on the position of the stylus tip, included in the calibration measurement data obtained by the calibration measurement section, for each of a predetermined number of sectors obtained in advance by dividing a measurement range in the height direction; and a data correction section for selecting a correction parameter value as a selected correction parameter value optimal to a sector to which measured data obtained when the stylus tip traces a measurement-target workpiece belongs, the sector being identified by a height value of the measured data, among the correction parameter values obtained by the correction-parameter setting section, and for using the selected correction parameter value to correct the measured data, wherein the measurement error is generated due to the stylus movement in the correction target plane, and the measurement error targets a shift of the position of the stylus tip, corresponding to the position of the stylus tip in the height direction in the correction target plane.

16. The measurement apparatus according to claim 15, wherein the stylus is a pivot-type stylus performing a circular-arc movement in the correction target plane, and
the correction unit corrects a measurement error caused by the circular-arc movement of the pivot-type stylus in the correction target plane.

17. The measurement apparatus according to claim 15, wherein the stylus is a linearly moving stylus performing straight movement in the correction target plane, and
the correction unit corrects a measurement error caused by straightness deviations of the straight movement of the linearly moving stylus in the correction target plane.

18. The measurement apparatus according to claim 15, wherein the correction-parameter setting section estimates the correction parameter value by a robust estimation method such that a degree of influence of outlier included in the calibration measurement data, on a calculation of the correction parameter value, is minimized.

19. The measurement apparatus according to claim 15, wherein, in order not to generate a difference greater than a predetermined value between correction parameter values in adjacent sectors of the sectors when the correction parameter values are obtained, a constrained condition is applied to the correction parameter values in the adjacent sectors to associate the correction parameter values in the adjacent sectors with each other.

20. The measurement apparatus according to claim 15, further comprising:
a pre-processor provided prior to the correction-parameter setting section, for optimizing a design value,
wherein the correction-parameter setting section obtains the one or more correction parameter values with one or more initial values being set to the design value optimized by the pre-processor.

* * * * *